US008160331B2

(12) United States Patent
Otsuka

(10) Patent No.: US 8,160,331 B2
(45) Date of Patent: Apr. 17, 2012

(54) IMAGE PROCESSING APPARATUS AND COMPUTER PROGRAM PRODUCT

(75) Inventor: Takeshi Otsuka, Tokyo (JP)

(73) Assignee: Olympus Corporation, Tokyo (JP)

( * ) Notice: Subject to any disclaimer, the term of this patent is extended or adjusted under 35 U.S.C. 154(b) by 469 days.

(21) Appl. No.: 12/431,923

(22) Filed: Apr. 29, 2009

(65) Prior Publication Data

US 2009/0274351 A1 Nov. 5, 2009

(30) Foreign Application Priority Data

May 2, 2008 (JP) ................................ 2008-120452

(51) Int. Cl.
*G06K 9/46* (2006.01)
(52) U.S. Cl. ...................................................... 382/128
(58) Field of Classification Search .......... 382/128–131, 382/165
See application file for complete search history.

(56) References Cited

U.S. PATENT DOCUMENTS

| 5,790,692 | A * | 8/1998 | Price et al. ..................... 382/133 |
| 7,567,693 | B2 * | 7/2009 | deCharms ..................... 382/128 |
| 7,576,844 | B2 * | 8/2009 | Hairston et al. ............... 356/73 |
| 7,587,076 | B2 * | 9/2009 | Kraus et al. ................... 382/128 |
| 7,590,270 | B2 * | 9/2009 | Asbeck et al. ................ 382/128 |
| 2002/0102018 | A1 * | 8/2002 | Lin et al. ....................... 382/165 |
| 2006/0127880 | A1 * | 6/2006 | Harris et al. .................. 435/4 |
| 2010/0189321 | A1 * | 7/2010 | Otsuka ........................ 382/128 |
| 2011/0235881 | A1 * | 9/2011 | Lett et al. ..................... 382/129 |

OTHER PUBLICATIONS

Fujii, K., et al., "Development of support systems for pathology using spectral transmittance—The quantification method of stain conditions", Proceedings of the SPIE, 2002, pp. 1516-1523, vol. 4684.
Abe, T, et al., "Color Correction of Pathological Images Based on Dye Amount Quantification", Optical Review, 2005, pp. 293-300, vol. 12, No. 4.

* cited by examiner

*Primary Examiner* — Nathan Ha
(74) *Attorney, Agent, or Firm* — Scully, Scott, Murphy & Presser, P.C.

(57) ABSTRACT

An image processing apparatus includes a spectral-characteristic estimating unit that estimates, based on a pixel value of a pixel of a stained sample image, a spectral characteristic value of each wavelength at a corresponding point on a stained sample corresponding to the pixel, the stained sample image being obtained by imaging the stained sample that is stained with a plurality of dyes. The image processing apparatus also includes a weight setting unit that sets a weight value of each wavelength based on the spectral characteristic value of each wavelength estimated by the spectral-characteristic estimating unit; and a weighted dye-amount estimating unit that estimates an amount of dye at the corresponding point on the stained sample as a weighted dye amount based on the spectral characteristic value of each wavelength estimated by the spectral-characteristic estimating unit using the weight value of each wavelength.

36 Claims, 16 Drawing Sheets

ARRANGEMENT OF CCD COLOR FILTERS

PIXEL ARRANGEMENT OF EACH BAND OF RGB

IMAGE PROCESSING APPARATUS AND COMPUTER PROGRAM PRODUCT

CROSS-REFERENCE TO RELATED APPLICATIONS

This application is based upon and claims the benefit of priority from Japanese Patent Application No. 2008-120452, filed on May 2, 2008, the entire contents of which are incorporated herein by reference.

BACKGROUND OF THE INVENTION

1. Field of the Invention

The present invention relates to an image processing apparatus and a computer program product that estimate an amount of dye in a stained sample from a stained sample image that is obtained by imaging the stained sample stained with a plurality of dyes.

2. Description of the Related Art

As one of physical quantities that indicate inherent physical property of a subject of imaging, there is a spectral transmittance. The spectral transmittance is a physical quantity that indicates a rate of transmitted light of incident light at each wavelength, and is inherent information for a substance, and the value thereof is not affected by an extrinsic influence, unlike color information that is dependent on a change of illumination light, as an RGB value. Therefore, the spectral transmittance is used in various fields as information to reproduce color of the subject. For example, for a living tissue specimen, particularly in a field of pathology using pathological samples, a technology of estimating spectral transmittance is used in the analysis of images of samples as one example of spectroscopic characteristics.

In pathology, such a process is widely practiced that a pathological sample is magnified to be observed using a microscope after slicing a block sample obtained by excision of an organ or a sample obtained by needle biopsy into piece having several microns of thickness to obtain various findings. Transmission observation using an optical microscope is one of the methods that are most widely used because the equipments are relatively inexpensive and easy to be handled, and this method has a long history. In this case, because a sliced sample absorbs or scatters little light and is almost transparent and colorless, it is common to stain the sample with a dye prior to observation.

As staining methods, various methods have been proposed, and there are more than 100 methods in total. Particularly for pathological samples, hematoxylineosin stain (hereinafter, "H&E stain") using bluish purple hematoxylin and red eosin as dyes is generally used.

Hematoxylin is a natural substance that is extracted from a plant, and has no stainability itself. However, hematin, which is an oxide of hematoxylin, is a basophilic dye and combines with a substance negatively charged. Because deoxyribonucleic acid (DNA) included in a cell nucleus is negatively charged due to a phosphate group included therein as a structural element, DNA combines with hematin to be stained bluish purple. As described, substance having stainability is not hematoxylin but its oxide, hematin; however, because it is common to use hematoxylin as the name of the dye, this practice is followed in the following explanation. On the other hand, eosin is acidophilic dye, and combines with a substance positively charged. Amino acid and protein are charged positively or negatively depending on a pH environment, and have inclination to be charged positively under acidity. For this reason, there is a case where acetic acid is added to eosin. Protein included in a cytoplasm combines with eosin to be stained red or light red.

In a sample subjected to H&E stain (stained sample), a cell nucleus, bone tissues, and the like are stained bluish purple, and cytoplasm, a connective tissue, red corpuscles, and the like are stained red, to become easily visible. As a result, an observer can grasp the size, positional relation, or the like of elements structuring a cell nuclei or the like, and can determine a state of the sample morphologically.

Observation of samples is performed by multiband imaging the sample to be displayed on a display screen of an external device, other than visual inspection by an observer. In the case of displaying on a display screen, processing to estimate spectral transmittance at each sample point from the multiband image obtained, processing to estimate an amount of dye with which the sample is stained based on the estimated spectral transmittance, processing to correct color of the image based on the estimated amount of dye, and the like are performed. As a result, variation in a property of the camera, a stain condition, or the like are corrected, and an RGB image for display of the sample is generated. FIG. 19 is a view showing one example of a composed RGB image. If the estimation of an amount of dye is appropriately performed, a sample that is stained dark or the sample stained light can be corrected to an image in colors equivalent to the sample that is properly stained.

As a method of estimating spectral transmittance at each sample point from multiband images of the samples, for example, an estimation method by principal component analysis (for example, "Development of support systems for pathology using spectral transmittance—The quantification method of stain conditions", Proceedings of SPIE, Vol. 4684, 2002, pp. 1516-1523), an estimation method by Wiener's estimation (for example, "Color Correction of Pathological Images Based on Dye Amount Quantification", OPTICAL REVIEW, Vol. 12, No. 4, 2005, pp. 293-300), and the like can be used. Wiener's estimation is widely known as one of liner filtering methods by which an original signal is estimated from an observed signal on which noise is superimposed, and is a method in which minimization of error is performed considering statistical properties of a subject of observation and characteristics of noise (observation noise). Because some noise is included in a signal from a camera, Wiener's estimation is a very effective as a method of estimating an original signal.

A method of synthesizing an RGB image from a multiband image of a sample is explained. First, a multiband image of a sample is obtained. For example, using a technique disclosed in Japanese Patent Laid-Open Publication No. H7-120324, multiband images are taken by a frame sequential method while switching 16 pieces of band-pass filters by rotating a filter wheel. Thus, multiband images having pixel values of 16 bands at each sample point can be obtained. Although a dye is three-dimensionally distributed in the sample being a subject of observation in an actual state, it cannot be taken as a three-dimensional image as it is with an ordinary transmission observing system, and is observed as a two-dimensional image in which illumination light that has passed the sample is projected on an imaging device of the camera. Accordingly, each point mentioned herein signifies a point on the sample corresponding to each projected pixel of the imaging device.

For an arbitrary point x in the imaged multiband image, there is relation expressed as in the following equation (1) based on a response system of the camera, between a pixel value g(x, b) in band b and spectral transmittance t(x, λ) of a corresponding point on the sample.

$$g(x,b) = \int_\lambda f(b,\lambda)s(\lambda)e(\lambda)t(x,\lambda)d\lambda + n(b) \quad (1)$$

where λ indicates wavelength, f(b, λ) indicates spectral transmittance of a b-th filter, s(λ) indicates spectral sensitivity property of the camera, e(λ) indicates spectral radiance property of illumination light, and n(b) indicates observation noise in band b. The variable b is a serial number to identify a band, and is an integer that satisfies 1≦b≦16 in this example.

In an actual calculation, the following equation (2) obtained by discretizing equation (1) is used.

$$G(x) = FSET(x) + N \quad (2)$$

When the number of sample points in a direction of wavelength is D and the number of bands is B (B=16 in this example), G(x) is a matrix of B×1 corresponding to the pixel value g(x, b) at the point x. Similarly, T(x) is a matrix of D×1 corresponding to t(x, λ), and F is a matrix of B×D corresponding to f(b, λ). On the other hand, S is a diagonal matrix of D×D and a diagonal element corresponds to s(λ). Similarly, E is a diagonal matrix of D×D and a diagonal element corresponds to e(λ). N is a matrix of B×1 corresponding to n(b). In equation (2), because expressions of a plurality of bands are put together using a matrix, a variable b indicating a band is not specified in equation (2). Moreover, an integral of the wavelength λ is replaced with the product of matrices.

To simplify description, a matrix H defined by the following equation (3) is introduced. H is also called a system matrix.

$$H = FSE \quad (3)$$

Next, spectral transmittance at each sample point is estimated from the imaged multiband image using Wiener's estimation. An estimation value of spectral transmittance (spectral transmittance data) $\hat{T}(x)$ can be calculated by the following equation (4).

$$\hat{T}(x) = WG(x) \quad (4)$$

where W is expressed by a following equation, and is called "Wiener's estimation matrix" or "estimation operator used in Wiener's estimation". In the explanation below, W is simply referred to as "estimation operator".

$$W = R_{SS}H^t(HR_{SS}H^t + R_{NN})^{-1} \quad (5)$$

where ( )$^t$ indicates a transposed matrix, and ( )$^{-t}$ indicates an inverse matrix. Furthermore, $R_{SS}$ is a matrix of D×D, and expresses an autocorrelation matrix of spectral transmittance of the sample. $R_{NN}$ is a matrix of B×B, and expresses an autocorrelation matrix of noise of the camera used for imaging.

After thus estimating the spectral transmittance data $\hat{T}(x)$, an amount of dye at a corresponding sample point (corresponding point) is estimated based on this $\hat{T}(x)$. Dyes to be subjects of estimation are three kinds of dyes: hematoxylin, eosin that stains cytoplasm, and eosin that stains red corpuscles or red corpuscles that are not stained. Three kinds of dyes are abbreviated as dye H, dye E, and dye R, respectively. Precisely, red corpuscles have a peculiar color even in a not stained state, and after the H&E stain is performed, the color of red corpuscles and the color of eosin that has changed in a staining process are superimposed with each other at the time of observation. Therefore, in precise, color obtained by combining the both is called dye R.

Generally, it is known that Lambert-Beer law expressed by the following equation (6) is satisfied between intensity $I_0(\lambda)$ of incident light at each wave length λ and intensity I(λ) of emitting light in a substance passing light.

$$\frac{I(\lambda)}{I_0(\lambda)} = e^{-k(\lambda) \cdot d} \quad (6)$$

where k(λ) indicates an inherent value of a substance dependent on wavelength, and d indicates thickness of a substance. Moreover, the left side of equation (6) indicates spectral transmittance.

When a sample subjected to H&E stain is stained with three kinds of dyes of dye H, dye E, and dye R, a following equation (7) is satisfied at each wavelength λ by Lambert-Beer law.

$$\frac{I(\lambda)}{I_0(\lambda)} = e^{-(k_H(\lambda) \cdot d_H + k_E(\lambda) \cdot d_E + k_R(\lambda) \cdot d_R)} \quad (7)$$

where $k_H(\lambda)$, $k_E(\lambda)$, and $k_R(\lambda)$ indicate k(λ) corresponding to dye H, dye E, and dye R, respectively, and are standard spectral properties of respective dyes that stain the sample, for example. Furthermore, $d_H$, $d_E$, and $d_R$ indicate virtual thickness of dye H, dye E, and dye R at each sample point corresponding to each image position of the multiband image. Originally, dyes are dispersed in a sample, and therefore, thickness is not a correct idea. However, this can be an index of a relative amount of dye that indicates how much amount of dye is present compared to a case where the sample is stained with a single dye. In other words, $d_H$, $d_E$, and $d_R$ indicate amounts of dye H, dye E, and dye R, respectively. The values $k_H(\lambda)$, $k_E(\lambda)$, and $k_R(\lambda)$ can be easily acquired from Lambert-Beer law, by preparing samples that are stained respectively using dye H, dye E, and dye R, and by measuring spectral transmittance with a spectrometer.

If logarithms of both sides of equation (7) are taken, the flowing equation (8) is obtained.

$$-\log \frac{I(\lambda)}{I_0(\lambda)} = k_H(\lambda) \cdot d_H + k_E(\lambda) \cdot d_E + k_R(\lambda) \cdot d_R \quad (8)$$

When an element corresponding to the wavelength λ of the spectral transmittance data $\hat{T}(x)$ thus estimated is $\hat{t}(x, \lambda)$, and if this is substituted in equation (8), the flowing equation (9) is obtained.

$$-\log \hat{t}(x,\lambda) = k_H(\lambda) \cdot d_H + k_E(\lambda) \cdot d_E + k_R(\lambda) \cdot d_R \quad (9)$$

Estimated absorbance $\hat{a}(x, \lambda)$ can be calculated according to the following equation (10) based on the spectral transmittance $\hat{t}(x, \lambda)$.

$$\hat{a}(x,\lambda) = -\log \hat{t}(x,\lambda) \quad (10)$$

Therefore, equation (9) can be replaced with the following equation (11).

$$\hat{a}(x,\lambda) = k_H(\lambda) \cdot d_H + k_E(\lambda) \cdot d_E + k_R(\lambda) \cdot d_R \quad (11)$$

In equation (11), unknown variables are three variables of $d_H$, $d_E$ and $d_R$. Therefore, if simultaneous equations are acquired from equation (11) for at least three different wavelengths λ, these can be solved. To further improve the accuracy, acquiring simultaneous equations from equation (11) for four or more different wavelengths λ, multiple regression analysis can be performed. For example, simultaneous equations acquired from equation (11) for three wavelengths $\lambda_1$, $\lambda_2$, $\lambda_3$ can be expressed in a matrix as the following equation (12).

$$\begin{pmatrix} \hat{a}(x,\lambda_1) \\ \hat{a}(x,\lambda_2) \\ \hat{a}(x,\lambda_3) \end{pmatrix} = \begin{pmatrix} k_H(\lambda_1) & k_E(\lambda_1) & k_R(\lambda_1) \\ k_H(\lambda_2) & k_E(\lambda_2) & k_R(\lambda_2) \\ k_H(\lambda_3) & k_E(\lambda_3) & k_R(\lambda_3) \end{pmatrix} \begin{pmatrix} d_H \\ d_E \\ d_R \end{pmatrix} \quad (12)$$

Equation (12) is replaced with the following equation (13).

$$\hat{A}(x) = Kd(x) + \epsilon \quad (13)$$

When the number of sample points in a direction of wavelength is D, $\hat{A}(x)$ is a matrix of D×1 corresponding to $\hat{a}(x, \lambda)$, K is a matrix of D×3 corresponding to $k(\lambda)$, $d(x)$ is a matrix of 3×1 corresponding to $d_H$, $d_E$, and $d_R$ at the point x, and $\epsilon$ is a matrix of D×1 corresponding to an error.

According to equation (13), the amount of dye $d_H$, $d_E$, and $d_R$ are calculated using a least square method. The least square method is a method of determining $d(x)$ such that the square sum of the error is minimized in single regression analysis, and it can be calculated by the following equation (14).

$$d(x) = (K^T K)^{-1} K^T \hat{A}(x) \quad (14)$$

If the amount of dye $d_H$, $d_E$, and $d_R$ are acquired as described above, a change in the amount of dye in the sample can be simulated by correcting these amounts. Specifically, it is adjusted by multiplying the respective amount of dye $d_H$, $d_E$, and $d_R$ by appropriate coefficients $\alpha_H$, $\alpha_E$, $\alpha_R$, to be substituted in equation (7). Thus, new spectral transmittance $t^*(x, y)$ can be obtained by the following equation (15).

$$t^*(x,\lambda) = e^{-(k_H(\lambda)\cdot\alpha_H d_H + k_E(\lambda)\cdot\alpha_E d_E + k_R(\lambda)\cdot\alpha_R d_R)} \quad (15)$$

If equation (15) is substituted in the equation (1), an image of the sample in which amount of dye is virtually changed can be synthesized. In this case, it can be calculated assuming noise n(b) is zero.

By estimating the amount of dye at the arbitrary point x in a multiband image by the above procedure, the amount of dye of the sample can be corrected by virtually adjusting the amount of dye at each sample point and synthesizing an image of the sample after adjustment. Therefore, even if there is variation in stain of the sample, for example, a user can observe an image that is adjusted to an appropriate stain condition.

SUMMARY OF THE INVENTION

An image processing apparatus according to an aspect of the present invention includes a spectral-characteristic estimating unit that estimates, based on a pixel value of a pixel of a stained sample image, a spectral characteristic value of each wavelength at a corresponding point on a stained sample corresponding to the pixel, the stained sample image being obtained by imaging the stained sample that is stained with a plurality of dyes. The image processing apparatus also includes a weight setting unit that sets a weight value of each wavelength based on the spectral characteristic value of each wavelength estimated by the spectral-characteristic estimating unit; and a weighted dye-amount estimating unit that estimates an amount of dye at the corresponding point on the stained sample as a weighted dye amount based on the spectral characteristic value of each wavelength estimated by the spectral-characteristic estimating unit using the weight value of each wavelength.

A computer program product according to another aspect of the present invention has a computer readable medium including programmed instructions for estimating an amount of dye of a stained sample from a stained sample image obtained by imaging the stained sample stained with a plurality of dyes. The instructions, when executed by a computer, cause the computer to perform: estimating, based on a pixel value of a pixel constituting the stained sample image, a spectral characteristic value of each wavelength at a corresponding point on the stained sample corresponding to the pixel; setting a weight value of each wavelength based on the spectral characteristic value of each wavelength corresponding to the pixel value of the pixel according to correlation between the pixel value and the spectral characteristic value of each wavelength, the correlation set in advance; and estimating an amount of dye at the corresponding point on the stained sample as a weighted dye amount based on the estimated spectral characteristic value of each wavelength using the weight value of each wavelength.

The above and other features, advantages and technical and industrial significance of this invention will be better understood by reading the following detailed description of presently preferred embodiments of the invention, when considered in connection with the accompanying drawings.

DETAILED DESCRIPTION

Figure 1:
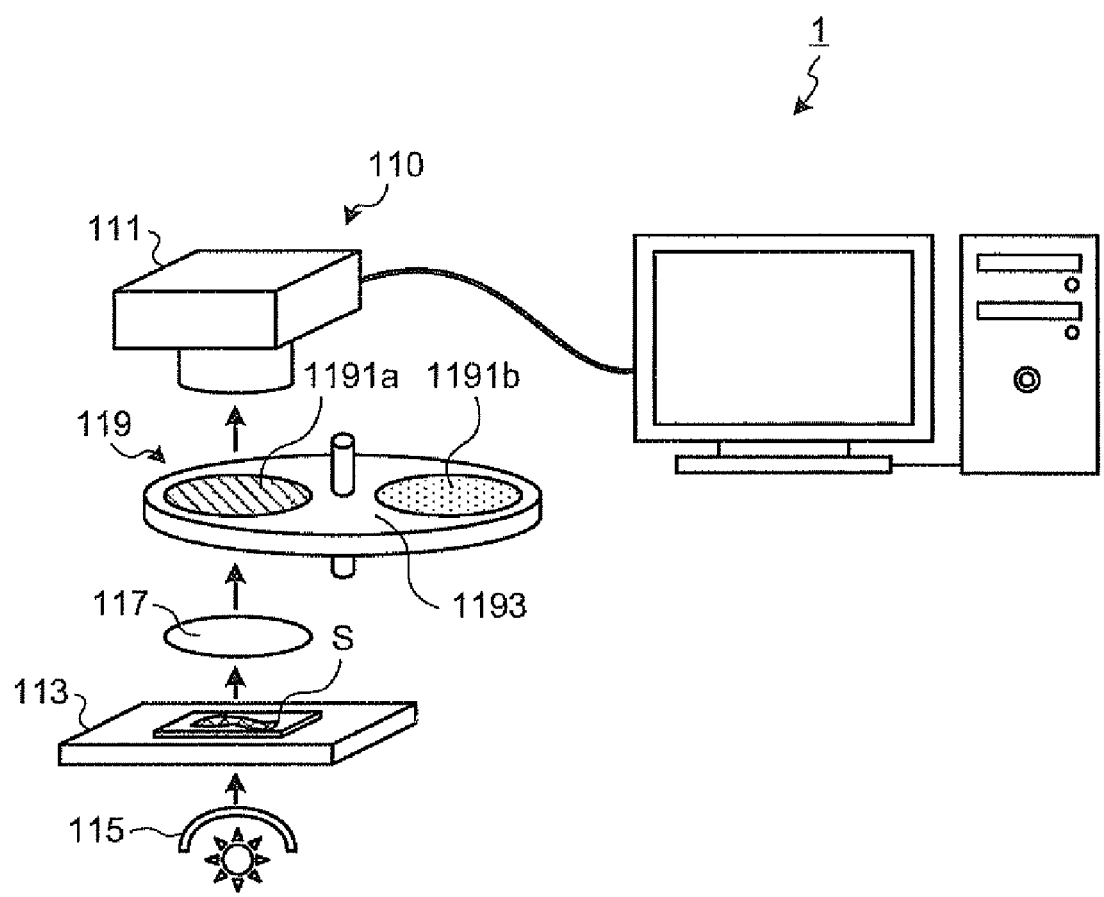
FIG. 1 is a schematic diagram for explaining a configuration of an image processing apparatus according to a first embodiment.

Exemplary embodiments according to the present invention are explained in detail below referring to the drawings. In the present embodiment, a living tissue sample (stained sample) that is stained by H&E stain is a subject of imaging. Spectral transmittance at each sample point of the stained sample is estimated using Wiener's estimation from an acquired multiband image, and amount of dye at each sample point is estimated using Lambert-Beer law. The present invention is not limited by this embodiment. Like reference characters refer to like parts throughout the drawings.

FIG. 1 is a schematic diagram for explaining a configuration of an image processing apparatus according to a first embodiment. As shown in FIG. 1, an image processing apparatus 1 is configured with a computer such as a personal computer, and includes an image acquiring unit 110 that acquires a multiband image of a stained sample.

The image acquiring unit 110 performs an image acquiring operation and images a stained sample (hereinafter, "subject sample") that is stained by H&E stain and is a subject of estimation of an amount of dye, to acquire a six-band multiband image. The image acquiring unit 110 includes an RGB camera 111 including an imaging device such as a charge-coupled device (CCD) and the like, a sample holding unit 113 on which a subject sample S is placed, an illuminating unit 115, an optical system 117, a filter unit 119, and the like. The illuminating unit 115 illuminates the subject sample S on the sample holding unit 113 with transmissive light. The optical system 117 collects transmission light from the subject sample S to form an image. The filter unit 119 is to limit a wavelength band of light to form an image to a predetermined range.

Figure 2:
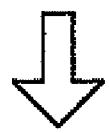
FIG. 2 is a schematic diagram showing arrangement of color filters and pixel arrangement of each band of RGB.

The RGB camera 111 is a camera that is widely used in a digital camera and the like, and in which RGB color filters are arranged on a monochrome imaging device in mosaic. This RGB camera 111 is arranged such that the center of a captured image is positioned on an optical axis of the illumination light. FIG. 2 is a schematic diagram showing arrangement of color filters and pixel arrangement of each band of RGB. Although with this arrangement, each pixel can only image a component of either one of R, G, B, lacked R, G, and B components are complemented by using adjacent pixel values. This technique is disclosed in, for example, Japanese Patent No. 3510037. If a 3CCD camera is used, R, G, B components at respective pixels can be acquired from the beginning. Although any imaging technique can be used in the first embodiment, in the explanation below, it is assumed that R, G, B components are acquired at respective pixels of an image captured by the RGB camera 111.

Figure 3:
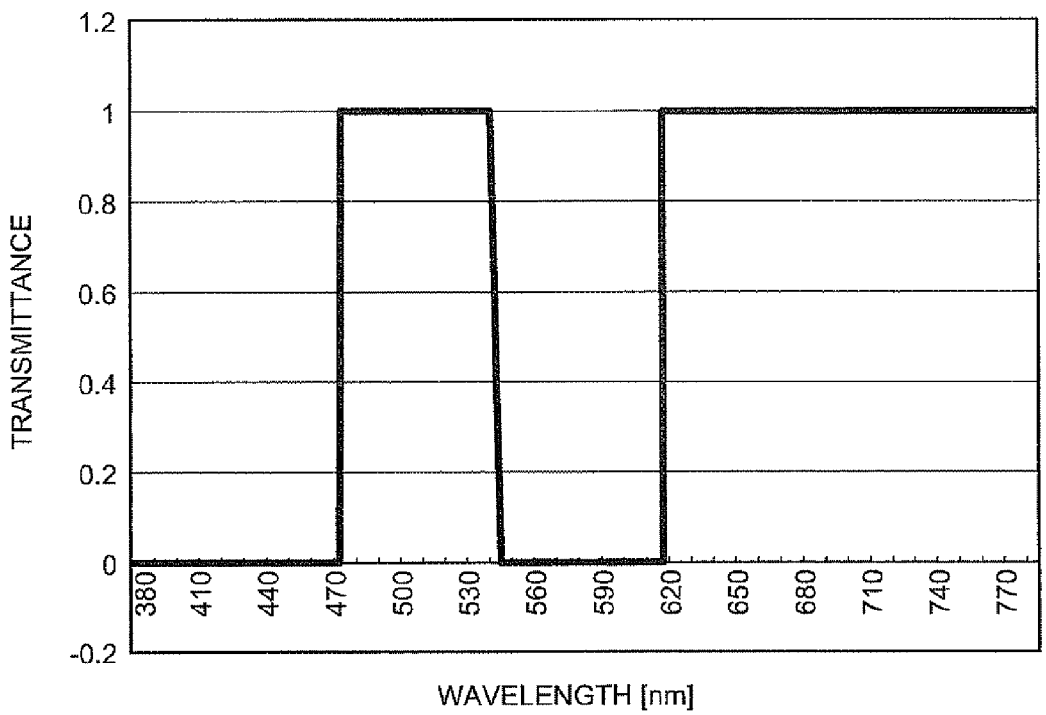
FIG. 3 is a schematic diagram showing a spectral transmittance property of one optical filter.
Figure 4:
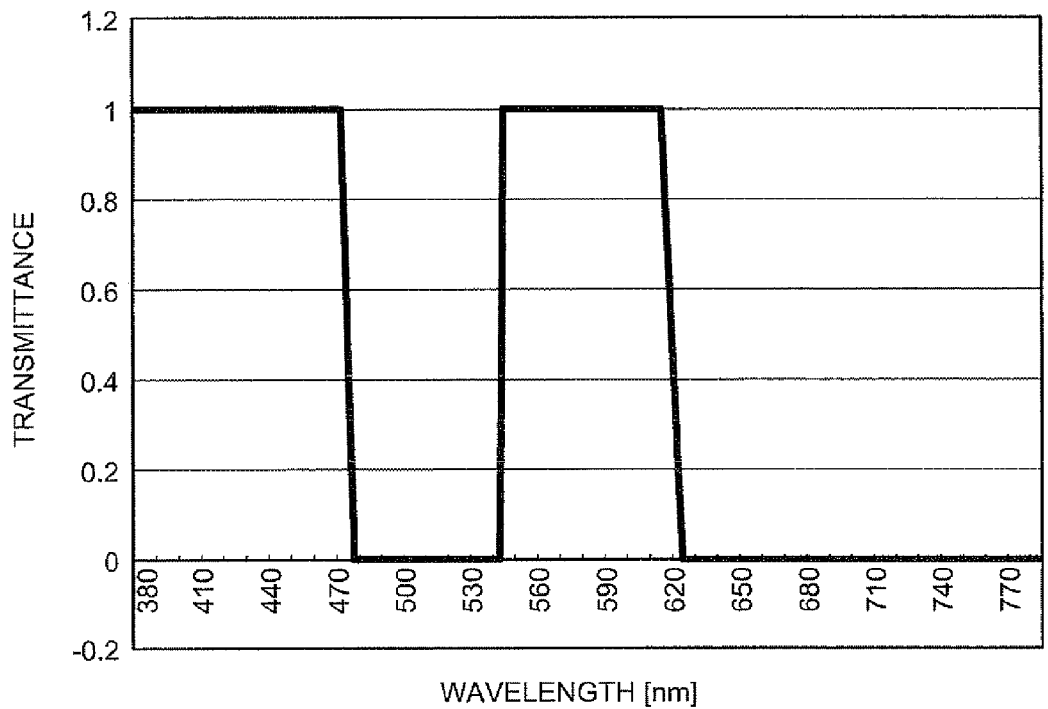
FIG. 4 is a schematic diagram showing a spectral transmittance property of another optical filter.

The filter unit 119 includes two pieces of optical filters 1191a and 1191b having different spectral transmittance properties, and is structured with a revolving optical-filter switching unit 1193 holding these optical filters 1191a and 1191b. FIG. 3 is a schematic diagram showing a spectral transmittance property of the optical filter 1191a, and FIG. 4 is a schematic diagram showing a spectral transmittance property of the other optical filter 1191b. For example, first, first imaging is performed using the optical filter 1191a. Subsequently, the optical filter to be used is changed to the optical filter 1191b by rotating the optical-filter switching unit 1193, to perform second imaging using the optical filter 1191b. By the first imaging and the second imaging, 3-band images are respectively acquired, and by combining the both images, a 6-band multiband image can be acquired. The number of optical filters is not limited to two, and three or more pieces of optical filters can be used. The acquired multiband image of the stained sample is stored in a storage unit 150 of the image processing apparatus 1 as a subject sample image.

Figure 5:
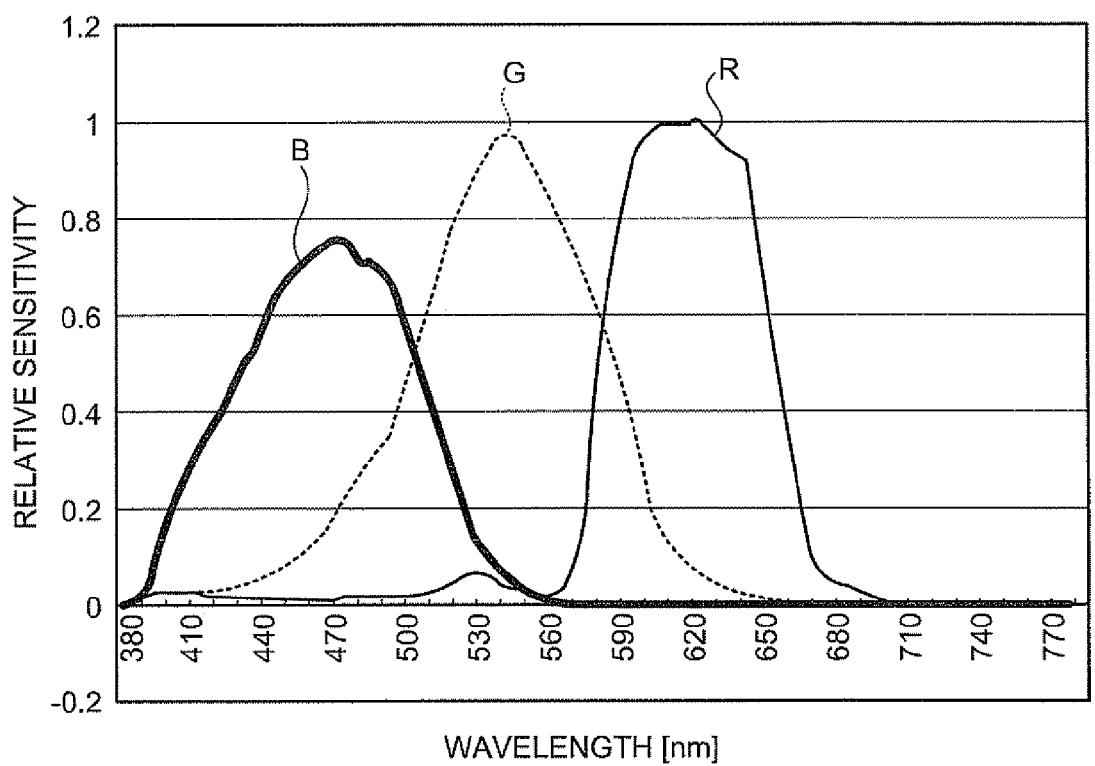
FIG. 5 is a schematic diagram showing an example of spectral sensitivity of each band of RGB.

In this image acquiring unit 110, illumination light emitted from the illuminating unit 115 passes through the subject sample S placed on the sample holding unit 113. The transmission light that has passed the subject sample S passes through the optical system 117 and the optical filters 1191a and 1191b, and then forms an image on the imaging device of the RGB camera 111. The optical filters 1191a and 1191b can be arranged at any position on an optical path from the illuminating unit 115 to the RGB camera 111. An example of spectral sensitivity of each band of R, G, and B when the illumination light from the illuminating unit 115 is imaged by the RGB camera 111 through the optical system 117 is shown in FIG. 5.

Figure 6:
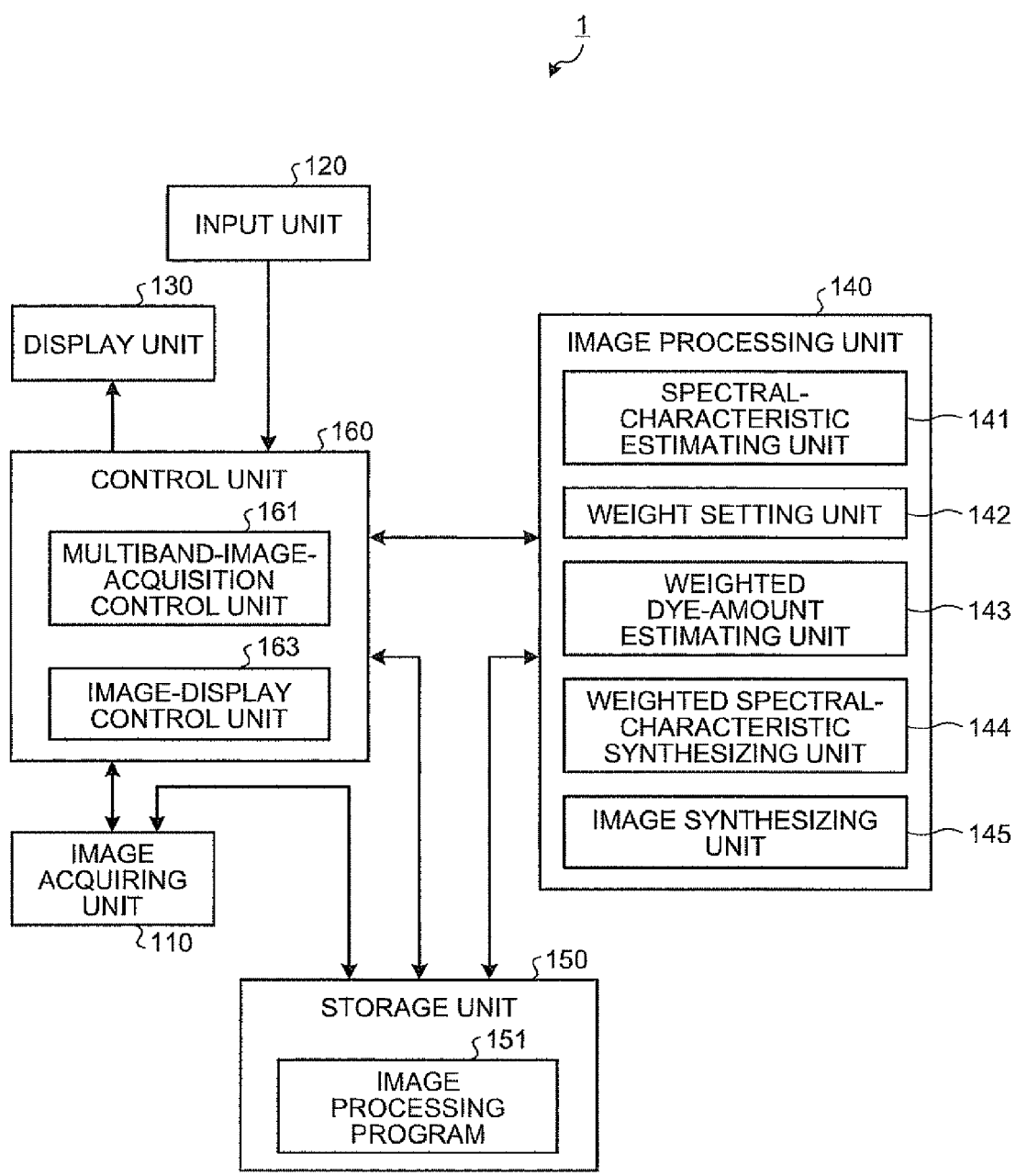
FIG. 6 is a block diagram of the image processing apparatus according to the first embodiment.

FIG. 6 is a block diagram of the image processing apparatus 1 according to the first embodiment. In the first embodiment, the image processing apparatus 1 includes the image acquiring unit 110 explained in FIG. 1, an input unit 120, a display unit 130, an image processing unit 140, the storage unit 150, and a control unit 160 that controls respective components.

The input unit 120 is implemented, for example, with a various kinds of input devices such as a keyboard, a mouse, a touch panel, and various kinds of switches, and outputs, to the control unit 160, an input signal corresponding to input made by operation thereof. The display unit 130 is implemented by a display device such as a liquid crystal display (LCD) and an electroluminescent display (ELD), and displays various screens based on a display signal input from the control unit 160.

The image processing unit 140 is implemented by hardware such as a central processing unit (CPU). The image processing unit 140 includes a spectral-characteristic estimating unit 141, a weight setting unit 142, a weighted dye-amount estimating unit 143, a weighted spectral-characteristic synthesizing unit 144, and an image synthesizing unit 145. The spectral-characteristic estimating unit 141 estimates spectral transmittance of each wavelength at corresponding points (hereinafter, "subject sample points") on a subject sample that correspond pixels constituting a subject sample image. The spectral transmittance estimated by the spectral-characteristic estimating unit 141 is referred to as "estimated spectral transmittance". The weight setting unit 142 sets a weight value of each wavelength that is used in dye amount estimation, based on the estimated spectral transmittance of each wavelength. The weighted dye-amount estimating unit 143 estimates an amount of dye at a subject sample point using the weight value of each wavelength based on the estimated spectral transmittance of each wavelength as weighted dye amount. The weighted spectral-characteristic synthesizing unit 144 synthesizes spectral transmittance based on the weighted dye amount, thereby calculating weighted synthesized-spectral transmittance of each wavelength that is one example of a weighted synthesized-spectral-characteristic value. The image synthesizing unit 145 synthesizes an RGB image to be displayed using the weighted synthesized-spectral transmittance of each wavelength.

The storage unit 150 is implemented by various kinds of integrated circuit (IC) memories such as a read only memory (ROM) and a random access memory (RAM) including a re-writable flash memory, a hard disk that is equipped therein or that is connected through a data communication terminal, an information storage medium such as a compact disk (CD) and a ROM and a reading device therefor, and the like. In this storage unit 150, a computer program to operate the image processing apparatus 1 and to implement various functions of the image processing apparatus 1, data that is used while the execution of the computer program, and the like are stored. For example, image data of a subject sample image and the like are stored. Moreover, an image processing program 151 to set a weight value of each wavelength based on the estimated spectral transmittance of each wavelength that is estimated from the subject sample image, and to perform processing of estimating a dye amount of the subject sample using this set weight value of each wavelength is stored.

The control unit 160 is implemented by hardware such as CPU. The control unit 160 gives instructions to the respective components constituting the image processing apparatus 1 and performs data transfer and the like based on an input signal that is input from the input unit 120, image data that is input from the image acquiring unit 110, a computer program and data that are stored in the storage unit 150, and the like, and controls operation of the entire image processing apparatus 1. Furthermore, the control unit 160 includes a multiband-image-acquisition control unit 161, and an image-display control unit 163. The multiband-image-acquisition control unit 161 acquires a subject sample image by controlling the operation of the image acquiring unit 110. The image-display control unit 163 performs a control to display an RGB image synthesized by the image synthesizing unit 145 on the display unit 130.

Figure 7:
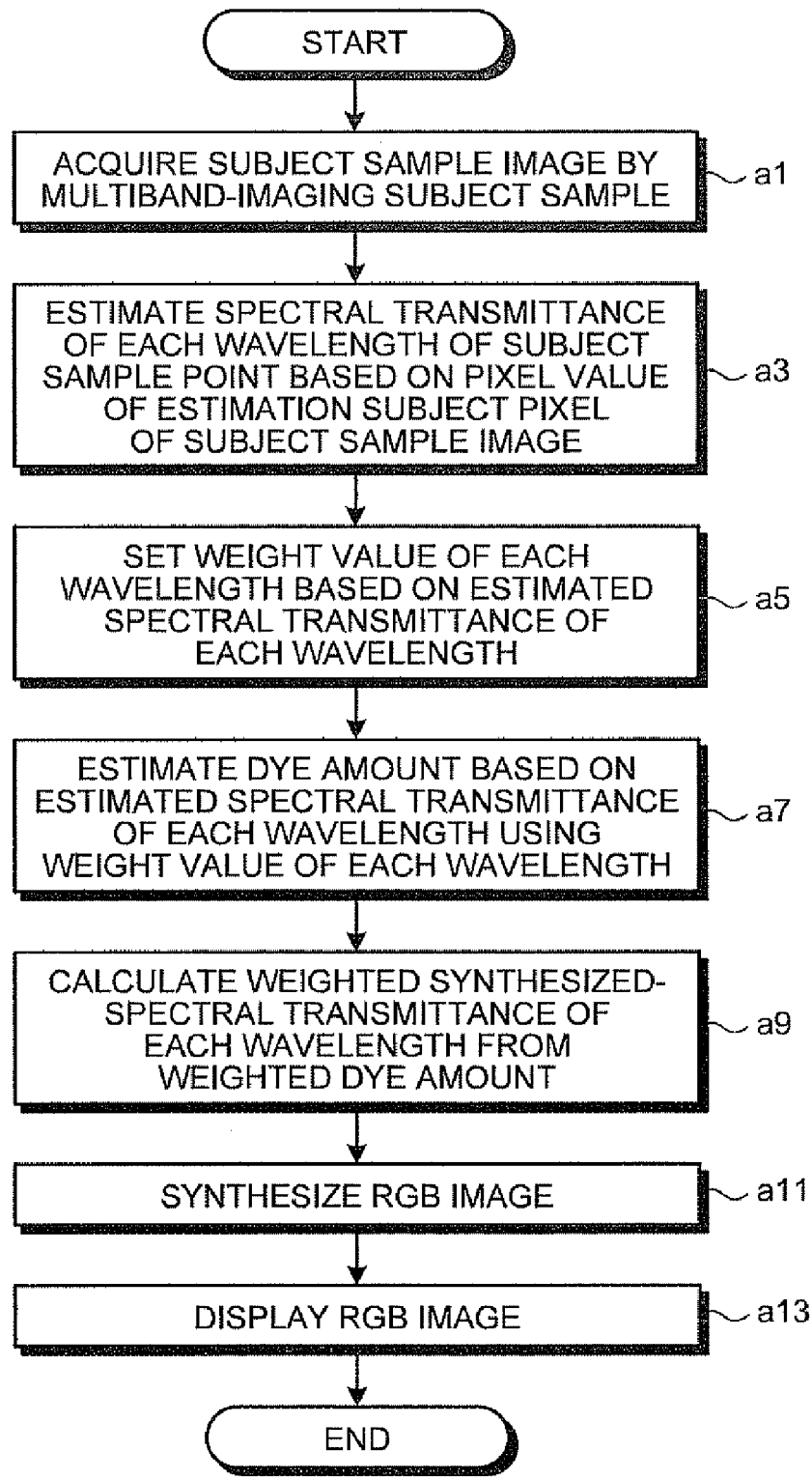
FIG. 7 is a flowchart showing processing performed by the image processing apparatus according to the first embodiment.

Next, processing performed by the image processing apparatus 1 according to the first embodiment is explained. FIG. 7 is a flowchart showing processing performed by the image processing apparatus 1 according to the first embodiment. The processing explained herein is achieved by operation of the respective components of the image processing apparatus 1 in accordance with the image processing program 151 stored in the storage unit 150.

As shown in FIG. 7, first, the multiband-image-acquisition control unit 161 controls operation of the image acquiring unit 110 to multiband-image a subject sample that is a subject of estimation of a dye amount, to acquire a subject sample image (step a1).

Subsequently, the spectral-characteristic estimating unit 141 estimates spectral transmittance (estimated spectral transmittance) of each wavelength at a subject sample point based on a pixel value of an estimation subject pixel of the subject sample image acquired at step a1 (step a3). Specifically, estimated spectral transmittance $\hat{T}(x)$ of each wavelength that is an estimated value of spectral transmittance of each wavelength at a corresponding subject sample point is calculated from a matrix expression G(x) of a pixel value of a pixel at the arbitrary point x that is the estimation subject pixel of the subject sample image, according to the following equation (4) described above. The acquired estimated spectral transmittance $\hat{T}(x)$ of each wavelength is stored in the storage unit 150.

$$\hat{T}(x)=WG(x) \tag{4}$$

At this time, the system matrix H that is defined by the following equation (3) is introduced as explained above.

$$H=FSE \tag{3}$$

The spectral radiance property E of illumination per unit time, the spectral transmittance of the optical filters 1191a and 1191b, and the spectral sensitivity property S of the RGB camera 111 are measured in advance using a spectrometer or the like, after equipments to be used are selected. In addition, the autocorrelation matrix $R_{SS}$ of spectral transmittance of the sample and the autocorrelation matrix of noise of the RGB camera 111 used for imaging $R_{NN}$ are also measured in advance. $R_{SS}$ can be acquired by preparing a typical sample that is stained by H&E stain, and by measuring spectral transmittance at a plurality of points by a spectrometer to acquire an autocorrelation matrix. $R_{NN}$ can be acquired by acquiring a multiband image by the image acquiring unit 110 in a state where no sample is placed, by acquiring dispersion of a pixel value for each band of the acquired 6-band multiband image, and by creating a matrix having the dispersion as a diagonal component. It is assumed that there is no correlation in noise between bands.

Figure 8:
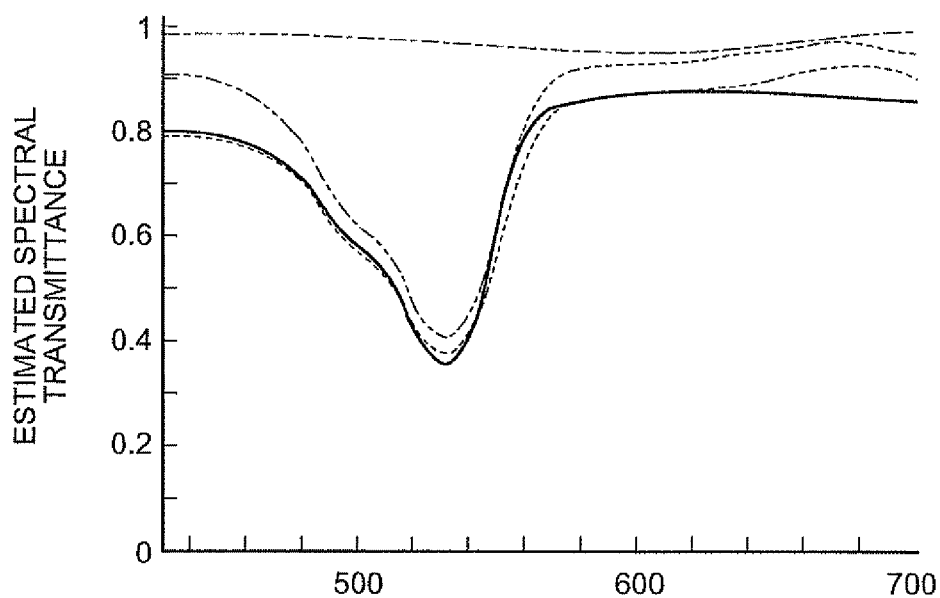
FIG. 8 is a chart showing an example of estimated spectral transmittance of each wavelength of a pixel having a high pixel value.
Figure 9:
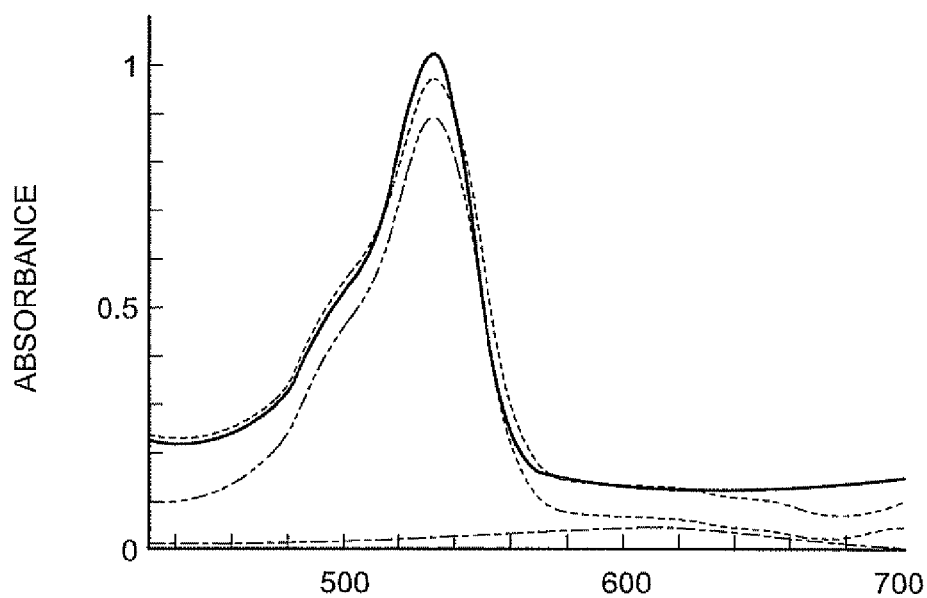
FIG. 9 is a chart showing an example of absorbance of each wavelength that is acquired by performing logarithmic conversion on the estimated spectral transmittance shown in FIG. 8.
Figure 10:
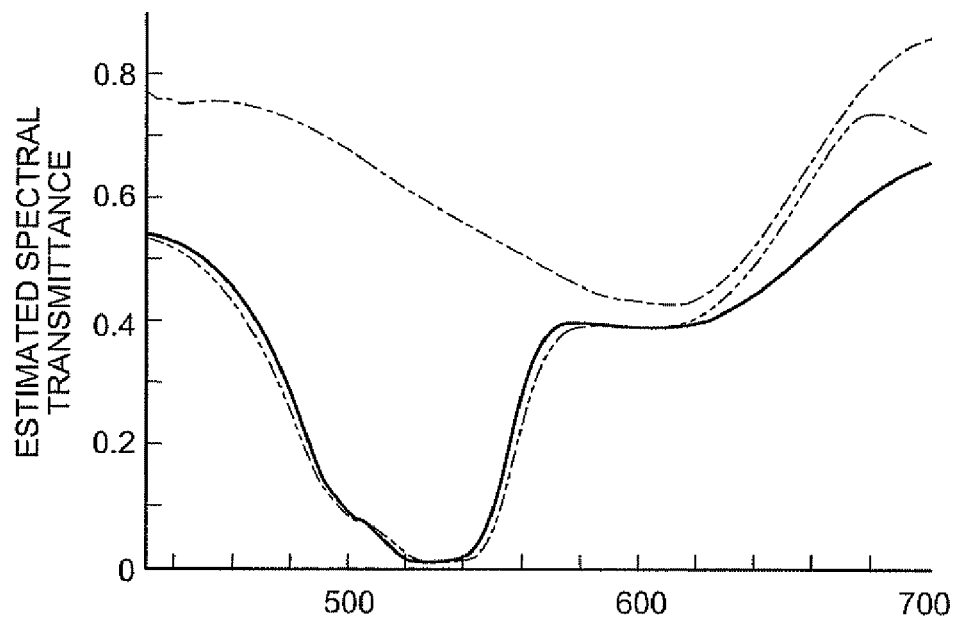
FIG. 10 is a chart showing an example of estimated spectral transmittance of each wavelength of a pixel having low pixel value.
Figure 11:
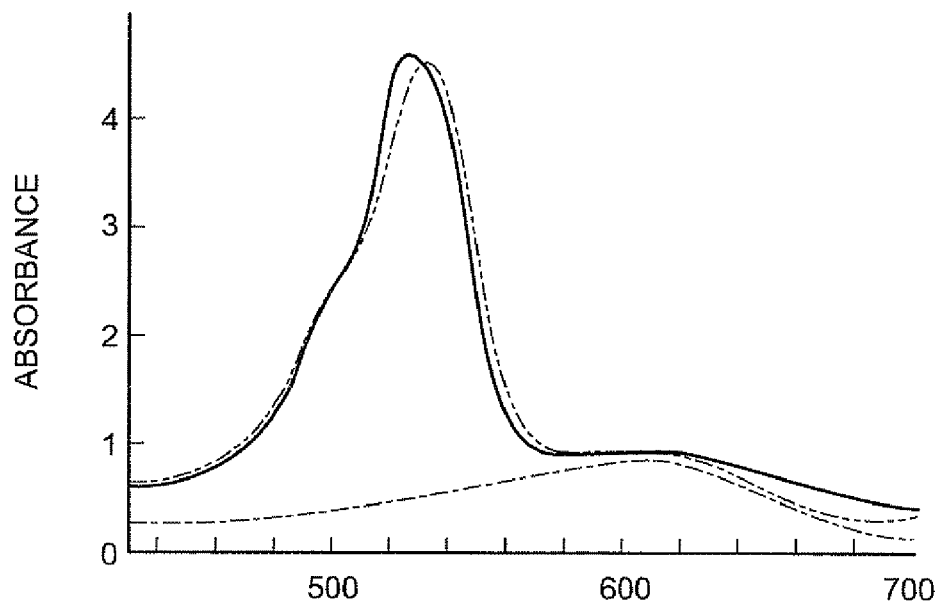
FIG. 11 is a chart showing an example of absorbance of each wavelength that is acquired by performing logarithmic conversion on the estimated spectral transmittance shown in FIG. 10.

Subsequently, the weight setting unit 142 sets a weight value of each wavelength based on the estimated spectral transmittance $\hat{T}(x)$ of each wavelength that is estimated at step a3 (step a5). The principle of setting of a weight value performed at step a5 is explained herein. FIG. 8 is a chart showing an example of estimated spectral transmittance of each wavelength of a pixel having a high pixel value, and FIG. 9 is a chart showing an example of absorbance of each wavelength that is acquired by performing logarithmic conversion on the estimated spectral transmittance shown in FIG. 8. On the other hand, FIG. 10 is a chart showing an example of estimated spectral transmittance of each wavelength of a pixel having a low pixel value, and FIG. 11 is a chart showing an example of absorbance of each wavelength that is acquired by performing logarithmic conversion on the estimated spectral transmittance shown in FIG. 10. In each chart, estimated spectral transmittance is shown by a sold line, spectral transmittance of dye H is shown by an alternate long and short dash line, spectral transmittance of dye H and dye E is shown by a long and two short dashes line, and spectral transmittance of dye H, dye E, and dye R is shown by a broken line. When the estimated spectral transmittances shown in FIG. 8 and FIG. 10 are compared among respective wavelengths, values of the estimated spectral transmittance in a wavelength band of 520 nm to 540 nm are particularly small, it is considered to be more likely to be affected by observation noise compared to other wavelength bands. Moreover, when waveforms of the respective spectral transmittance shown in FIG. 8 and FIG. 10 are compared, the estimated spectral transmittance of the pixel having a low pixel value has lower values compared to the estimated spectral transmittance of the pixel having a high pixel value shown in FIG. 8, and is considered to be more likely to be affected by observation noise. Therefore, it can be predicted that the estimation accuracy of spectral transmittance is lower as the value of estimated spectral transmittance becomes smaller. On the other hand, in the wavelength band in which the value of estimated spectral transmittance is high, it is less likely to be affected by observation noise compared to the wavelength band in which the value of estimated spectral transmittance is low, and therefore, it can be predicted that the estimation accuracy of spectral transmittance is high.

Because estimation of dye amount is performed based on the value of estimated spectral transmittance, if the estimation accuracy of spectral transmittance is low, the estimation accuracy of dye amount is degraded. On the other hand, the estimation of dye amount is performed using the absorbance that is acquired by performing logarithmic conversion on the value of the estimated spectral transmittance as shown in FIG. 9 or FIG. 11. Therefore, there is a problem that an error due to observation noise included in the value of estimated spectral transmittance is amplified as a result of conversion into absorbance. Further, an RGB value is calculate by synthesizing spectral transmittance based on the dye amount that is estimated using the value of the absorbance thus obtained. Therefore, there is a problem that even through the dye amount is estimated such that the error is minimized by applying the least square method, variation occurs in the error due to observation noise included in the synthesized spectral transmittance of each wavelength. Therefore, a weight value $\omega_\lambda$ at each wavelength is set such that an estimation result of spectral transmittance at wavelength in which the estimation accuracy of spectral transmittance is predicted to be low is less likely to be reflected in dye amount estimation, and an estimation result of spectral transmittance at wavelength in which the estimation accuracy is predicted to be high is likely to be reflected in dye amount estimation. Specifically, in the first embodiment, a value of estimated spectral transmittance of each wavelength is set as the weight value $\omega_\lambda$ of each wavelength according to the following equation (16). At this time, the weight value $\omega_\lambda$ of each wavelength can be set, standardizing the weight value $\omega_\lambda$ at a wavelength in which the value of estimated spectral transmittance is the largest as a maximum value "1". The weight value $\omega_\lambda$ is of wavelength $\lambda$.

$$\omega_\lambda = \hat{t}(x, \lambda) \tag{16}$$

This is repeated for D times, which is the number of wavelengths, and $\omega_1, \omega_2, \ldots, \omega_D$ are calculated. The calculated respective values of $\omega_1, \omega_2, \ldots, \omega_D$ are stored in the storage unit 150.

As described, by setting a value of estimated spectral transmittance of each wavelength as the weight value $\omega_\lambda$ of each wavelength, the estimation accuracy of dye amount can be improved. Moreover, amplification of an error due to observation noise that is caused when estimated spectral transmittance is converted into absorbance and variation of an error due to observation noise can be suppressed.

A method of setting the weight value $\omega_\lambda$ is not limited to the above method. For example, according to the following equations (17) and (18), the weight value $\omega_\lambda$ can be set, setting the weight value $\omega_\lambda$ at wavelength at which the estimated spectral transmittance $\hat{t}(x, \lambda)$ is equal to or larger than a predetermined threshold $t_{threshold}$ as "1", and the weight value $\omega_\lambda$ at wavelength at which the estimated spectral transmittance $\hat{t}(x, \lambda)$ is smaller than the threshold $t_{threshold}$ as "0". This enables to arrange such that the estimated spectral transmittance $\hat{t}(x, \lambda)$ at wavelength that is predicted that the estimation accuracy of spectral transmittance is low is not used in estimation of dye amount.

$$\omega_\lambda = 1, \text{ if } \hat{t}(x,\lambda) \geq t_{threshold} \tag{17}$$

$$\omega_\lambda = 0, \text{ otherwise} \tag{18}$$

The threshold $t_{threshold}$ can be set arbitrarily, and it is set to such a value that enhances the accuracy of dye amount estimation in advance. For example, the threshold $t_{threshold}$ is set such that the estimation accuracy of dye amount becomes as high as possible by using a result of dye amount estimation that is performed by a conventional technique based on the estimated spectral transmittance.

Furthermore, it is not limited to the case where a single threshold $t_{threshold}$ is set and the weight value $\omega_\lambda$ of each wavelength is set in two stages, and the threshold can be set in plurality in multistage, and the weight value of each wavelength can be set in stages corresponding to the value of estimated spectral transmittance.

Subsequently, as shown in FIG. 7, the weighted dye-amount estimating unit 143 estimates an amount of dye of the subject sample as a weighted dye amount based on the estimated spectral transmittance $\hat{T}(x)$ of each wavelength that is estimated at step a3, by using the weight value $\omega_\lambda$ of each wavelength set at step a5 (step a7). Dyes to be subjects of estimation are hematoxylin (dye H), eosin that has stained cytoplasm (dye E), and eosin that has stained red corpuscles and red corpuscles that are not stained (dye R). The weighted dye-amount estimating unit 143 estimates an amount dye H, dye E, and dye R that are fixed at a subject sample point corresponding to the point x based on the estimated spectral transmittance $\hat{T}(x)$ of each wavelength at the point x of the subject sample image. Specifically, the following equation (13) derived from Lambert-Beer law described above is set up simultaneously for each of a plurality of wavelengths $\lambda$, and solve the simultaneous equations for $d_H$, $d_E$, and $d_R$.

$$\hat{A}(x) = Kd(x) + \epsilon \tag{13}$$

According to equation (13), the weighted dye amounts $d_H$, $d_E$, and $d_R$ are calculated using the least square method. In the first embodiment, using the following equations (19) and (20), the weighted dye amounts $d_H$, $d_E$, and $d_R$ are calculated taking the weight value $\omega_\lambda$ ($\omega_1, \omega_2, \ldots, \omega_D$) into account.

$$d(x) = (K^T \omega K)^{-1} K^T \omega \hat{A}(x) \tag{19}$$

$$\text{where } \omega = diag(\omega_1 \omega_2 \ldots \omega_D) \tag{20}$$

The symbol $\omega$ indicates a matrix of D×D that corresponds the weight value $\omega_\lambda$, and diag( ) indicates a diagonal matrix. The weighted dye amounts $d_H$, $d_E$, and $d_R$ at the stain sample point corresponding to the point x of the subject sample image for which estimation has been performed using this weight value $\omega_\lambda$ are stored in the storage unit 150.

Subsequently, the weighted spectral-characteristic synthesizing unit 144 synthesizes spectral transmittance based on the weighted dye amounts $d_H$, $d_E$, and $d_R$ estimated at step a7, and calculates weighted synthesized-spectral transmittance of each wavelength (step a9). Specifically, the weighted dye amounts $d_H$, $d_E$, and $d_R$ acquired herein are substituted in equation (15) described above, and weighted synthesized-spectral transmittance $\tilde{t}(x, \lambda)$ as new spectral transmittance is acquired by the following equation (21). $\tilde{t}(x, \lambda)$ is a component that corresponds to the wavelength $\lambda$ out of the weighted synthesized-spectral transmittance of each wavelength.

$$\tilde{t}(x,\lambda) = e^{-(k_H(\lambda) \cdot \alpha_H d_H + k_E(\lambda) \cdot \alpha_E d_E + k_R(\lambda) \cdot \alpha_R d_R)} \tag{21}$$

When $\tilde{t}(x, \lambda)$ of a plurality of wavelengths calculated by equation (21) put together in a matrix is expressed as $\tilde{T}(x)$, $\tilde{T}(x)$ indicates weighted synthesized-spectral transmittance of each wavelength. This weighted synthesized-spectral transmittance data $\tilde{T}(x)$ is stored in the storage unit 150.

Subsequently, the image synthesizing unit 145 synthesizes an RGB image to be displayed using the weighted synthesized-spectral transmittance $\tilde{T}(x)$ (step a11). Specifically, processing from steps a3 to a9 are performed for all points x on the subject sample image as the estimation subject pixels, to acquire the weighted synthesized-spectral transmittance $\tilde{T}(x)$ of each wavelength. Processing of converting the weighted synthesized-spectral transmittance $\tilde{T}(x)$ of each wavelength acquired for each of the points x into an RGB value (step a11) is then repeated for the entire image, thereby acquiring an RGB image having the same width and height as the captured multiband image. To convert the weighted synthesized-spectral transmittance $\tilde{T}(x)$ of each wavelength into an RGB value $G_{RGB}(\lambda)$, the following equation (22) that is obtained by removing the noise component N in equation (2) described above is used.

$$G_{RGB}(x) = FSE\tilde{T}(x) \qquad (22)$$

The matrix S corresponds to a spectral sensitivity property of the RGB camera 111. Although it is convenient to use the spectral sensitivity property of the RGB camera 111, it can be one of another ROB camera. Data of the composed RGB image to be displayed is stored in the storage unit 150, and is used for pathological diagnosis and the like. For example, the image-display control unit 163 performs the control to display the RGB image composed at step a11 on the display unit 130 (step a13).

As described above, according to the first embodiment, a weight value of each wavelength can be set based on estimated spectral transmittance of each wavelength at a subject sample point that is estimated based on a pixel value of an estimation subject pixel of a subject sample image. Further, an amount of dye at the subject sample point can be estimated using the weight value set based on the estimated spectral transmittance of each wavelength at the subject sample point. Specifically, the estimation of an amount of dye can be performed while setting the weight value for a wavelength at which the value of the estimated spectral transmittance is small and the estimation accuracy is predicted to be low to a small value. Thus, estimation of an amount of dye can be performed considering wavelength at which the estimation accuracy of spectral transmittance is predicted to be low because of influence of observation noise, and the accuracy of estimation of an amount of dye can be improved.

In the first embodiment described above, a method in which a weight value of each wavelength is set based on estimated spectral transmittance of each wavelength, and an amount of dye is estimated using this weight value has been explained. A weighted dye amount can be estimated by setting a weight value based on absorbance of each wavelength obtained by performing logarithmic conversion on estimated spectral transmittance of each wavelength, and by using this weight value. Alternatively, not using a value of estimated spectral transmittance of each wavelength as it is as a weight value, for example, a converted value that is two-dimensionally calculated based on the value of estimated spectral transmittance, such as a square value of the estimated spectral transmittance of each wavelength, can be used as a weight value. Alternatively, a converted value is calculated based on absorbance of each wavelength that can be calculated from estimated spectral transmittance of each wavelength, to be used as a weight value. For example, by performing logarithmic conversion on estimated spectral transmittance of each wavelength, absorbance of each wavelength is calculated. The inverse of the calculated absorbance is calculated as a converted value, to be used as a weight value. Moreover, a converted value can be calculated by multiplying the calculated inverse of the absorbance of each wavelength and the square root of the estimated spectral transmittance of each wavelength together, to be used as a weight value. If a weight value is set by such ways, a difference (that is, estimation error) between estimated spectral transmittance of each wavelength and spectral transmittance synthesized from estimated dye amount is reduced, and there is an advantage that color reproducibility at the time of composing an RGB image for display is improved.

Furthermore, a value of spectral transmittance is determined uniquely corresponding to a pixel value. Therefore, it is possible to set correspondence between a pixel value and spectral transmittance thereof in advance. For example, it can be arranged such that spectral transmittance corresponding to various combinations of pixel values is acquired and recorded in a table in advance to be stored in the storage unit 150. By reading a value of spectral transmittance corresponding to a pixel value of an estimate subject pixel therefrom, and a weight value of each wavelength can be set based on this value. Alternatively, it can be configured such that a weight value of each wavelength is set in advance based on spectral transmittance corresponding to a combination of pixel values, and correspondence between a combination of pixel values and a weight value of each wavelength is recorded in a table to be stored in the storage unit 150, and then a weight value of each wavelength corresponding to a pixel value of an estimation subject pixel is read therefrom to be used.

Figure 12:
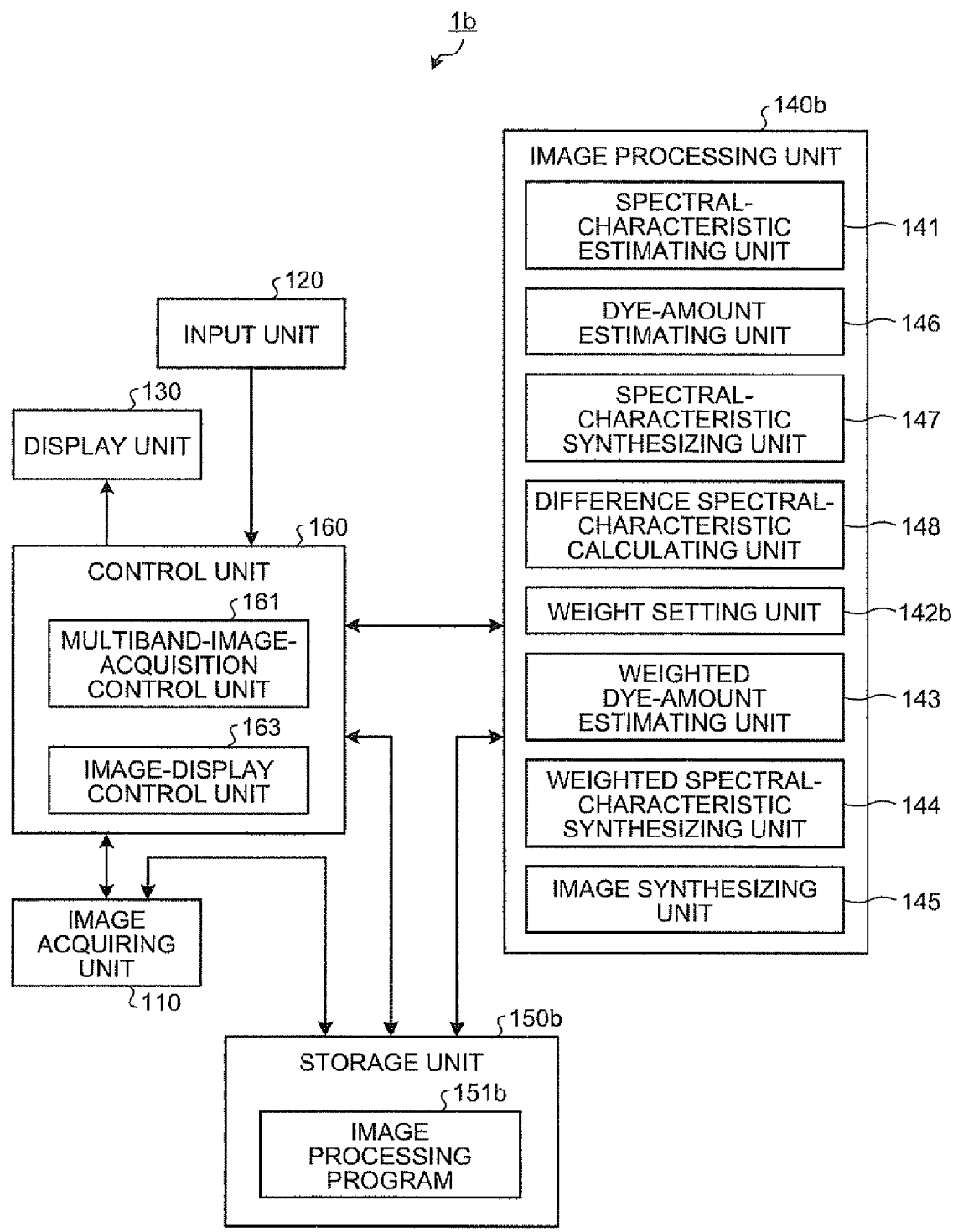
FIG. 12 is a block diagram of an image processing apparatus according to a second embodiment.

Next, a second embodiment is explained. FIG. 12 is a block diagram of an image processing apparatus 1b according to the second embodiment. Like reference characters refer to like parts explained in the first embodiment. In the second embodiment, the image processing apparatus 1b includes the image acquiring unit 110 shown in FIG. 1, the input unit 120, the display unit 130, an image processing unit 140b, a storage unit 150b, and the control unit 160 that controls the respective components.

The image processing unit 140b includes the spectral-characteristic estimating unit 141, a dye-amount estimating unit 146, a spectral-characteristic synthesizing unit 147, a difference-spectral-characteristic calculating unit 148, a weight setting unit 142b, the weighted dye-amount estimating unit 143, the weighted spectral-characteristic synthesizing unit 144, and the image synthesizing unit 145. The dye-amount estimating unit 146 estimates an amount of dye at a subject sample point based on estimate spectral transmittance of each wavelength that is estimated by the spectral-characteristic estimating unit 141. The amount of dye that is estimated by the dye-amount estimating unit 146 is referred to as "estimated dye amount". The spectral-characteristic synthesizing unit 147 calculates synthesized spectral transmittance of each wavelength by synthesizing spectral transmittance based on the estimated dye amount. The difference-spectral-characteristic calculating unit 148 calculates difference in spectral transmittance by subtracting the synthesized spectral transmittance of each wavelength from the estimate spectral transmittance of each wavelength. The weight setting unit 142b sets a weight value of each wavelength to be used in dye amount estimation based on the difference in spectral transmittance of each wavelength.

Moreover, in the storage unit 150b, an image processing program 151b to achieve processing of calculating difference in spectral transmittance of each wavelength, and of estimating an amount of dye of a subject sample by setting a weight value of each wavelength based on this difference in spectral transmittance difference in spectral transmittance is stored.

Figure 13:
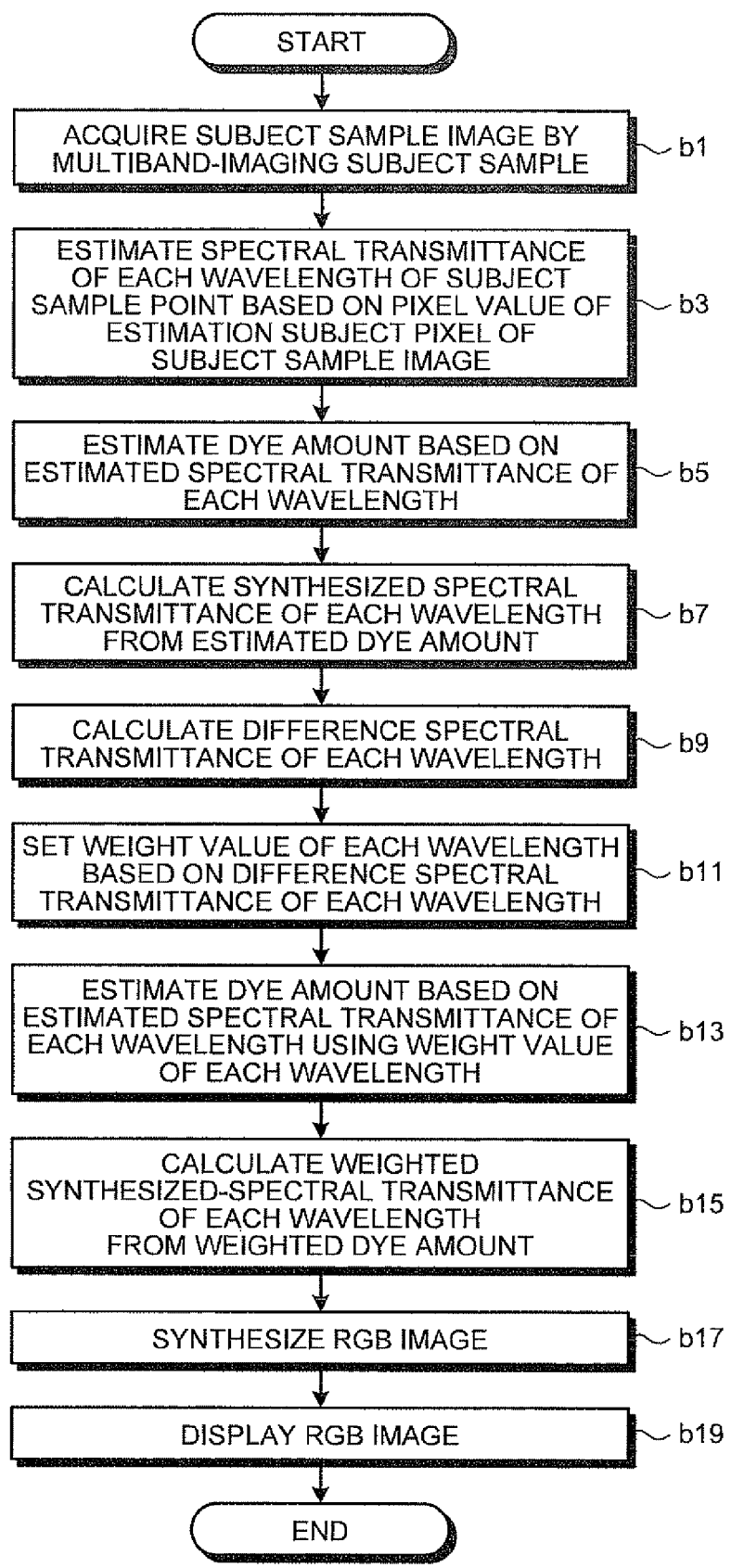
FIG. 13 is a flowchart showing processing performed by the image processing apparatus according to the second embodiment.

FIG. 13 is a flowchart showing processing performed by the image processing apparatus 1b according to the second embodiment. The processing explained herein is achieved by operation of the respective components of the image processing apparatus 1b in accordance with the image processing program 151b stored in the storage unit 150b.

As shown in FIG. 13, first, the multiband-image-acquisition control unit 161 controls operation of the image acquiring unit 110 to multiband-image a subject sample that is a subject of estimation of an amount of dye, to acquire a subject sample image (step b1).

Subsequently, similarly to the first embodiment, the spectral-characteristic estimating unit 141 estimates spectral transmittance (estimated spectral transmittance) of each wavelength at a subject sample point based on a pixel value of an estimation subject pixel of the subject sample image acquired at step b1 (step b3).

Subsequently, the dye-amount estimating unit 146 estimates an amount of dye (estimated dye amount) of the subject sample based on the estimated spectral transmittance $\hat{T}(x)$ of each wavelength that is estimated at step a3. At this time, the dye-amount estimating unit 146 calculates estimated dye amounts $d'_H$, $d'_E$, and $d'_R$ according to the following equation (14) described above, using the least square method. Specifically, estimation of an amount of dye is performed by a conventional method without using a weight value. These estimated dye amounts $d'_H$, $d'_E$, and $d'_R$ are stored in the storage unit 150b.

$$d(x)=(K^T K)^{-1} K^T \hat{A}(x) \tag{14}$$

Subsequently, the spectral-characteristic synthesizing unit 147 synthesizes spectral transmittance based on the estimated dye amounts $d'_H$, $d'_E$, and $d'_R$ estimated at step b5, and calculates synthesized spectral transmittance of each wavelength (step b7). Specifically, the estimated dye amounts $d'_H$, $d'_E$, and $d'_R$ are substituted in the equation (15) described above, and new spectral transmittance (synthesized spectral transmittance) $\tilde{t}'(x, \lambda)$ is acquired. $\tilde{t}'(x, \lambda)$ is a component corresponding to wavelength $\lambda$ out of synthesizes spectral transmittance of each wavelength.

$$\tilde{t}'(x,\lambda)=e^{-(k_H(\lambda)\cdot \alpha_H d'_H + k_E(\lambda)\cdot \alpha_E d'_E + k_R(\lambda)\cdot \alpha_R d'_R)} \tag{23}$$

When $\tilde{t}'(x, \lambda)$ corresponding to a plurality of wavelengths calculated by equation (23) put together in a matrix is expressed as $\tilde{T}'(x)$, $\tilde{T}'(x)$ indicates synthesized spectral transmittance of each wavelength. This synthesized spectral transmittance data $\tilde{T}'(x)$ of each wavelength is stored in the storage unit 150b. Subsequently, the difference-spectral-characteristic calculating unit 148 subtracts the synthesized spectral transmittance $\tilde{T}'(x)$ of each wavelength from the estimated spectral transmittance $\hat{T}(x)$ of each wavelength, to calculate difference spectral transmittance $T_{diff}(x)$ of each wavelength (step b9). This difference spectral transmittance $T_{diff}(\lambda)$ of each wavelength is stored in the storage unit 150b.

$$T_{diff}(x)=\hat{T}(x)-\tilde{T}'(x) \tag{24}$$

Subsequently, the weight setting unit 142b sets a weight value of each wavelength based on the difference spectral transmittance $T_{diff}(x)$ of each wavelength calculated at step b9 (step b11). When an element corresponding to wavelength $\lambda$ of the difference spectral transmittance $T_{diff}(x)$ is expressed as $t_{diff}(x, \lambda)$, it is indicated that an error in dye amount estimation is larger as the value of the difference spectral transmittance $t_{diff}(x, \lambda)$ becomes larger, and it is considered that the estimation accuracy of dye amount is degraded. In the second embodiment, a weight value for wavelength at which the difference spectral transmittance $t_{diff}(x, \lambda)$ is large is set to a small value, and a weight value for wavelength at which the difference spectral transmittance $t_{diff}(x, \lambda)$ is small to a large value.

Specifically, according to the following equation (25), the weight value $\omega_\lambda$ of each wavelength can be set, standardizing the weight value $\omega_\lambda$ at a wavelength in which the difference spectral transmittance $t_{diff}(x, \lambda)$ is the largest as a maximum value "1".

$$\omega_\lambda = \frac{1}{t_{diff}(x,\lambda)} \tag{25}$$

This is repeated for D times, which is the number of wavelengths, and $\omega_1, \omega_2, \ldots, \omega_D$ are calculated. The calculated respective values of $\omega_1, \omega_2, \ldots, \omega_D$ are stored in the storage unit 150b.

A method of setting the weight value $\omega_\lambda$ is not limited to the above method. For example, it can be configured such that difference spectral transmittance is compared with a predetermined threshold that is set in advance, and a weight value is set in two stages according to the value relative to the threshold. Alternatively, it can be configured such that a plurality of thresholds are set in multiple stages, and a weight value of each wavelength is set in stages according to the value of difference spectral transmittance.

Subsequently, the weighted dye-amount estimating unit 143 converts the estimated spectral transmittance $\hat{T}(x)$ of each wavelength that is estimated at step b3 into absorbance again, and estimates an amount of dye (weighted dye amount) of the subject sample by using the weight value $\omega_\lambda$ of each wavelength set at step b11 (step b13). The processing herein can be performed in a similar manner as the first embodiment. Subsequently, the weighted spectral-characteristic synthesizing unit 144 synthesizes spectral transmittance based on the weighted dye amount estimated at step b13, and calculates weighted synthesized-spectral transmittance of each wavelength (step b15). The image synthesizing unit 145 then synthesizes an RGB image to be displayed using the weighted synthesized-spectral transmittance of each wavelength (step b17), and the image-display control unit 163 performs the control to display the RGB image composed at step b17 on the display unit 130 (step b19).

As described, according to the second embodiment, first, estimation of an amount of dye is performed based on estimated spectral transmittance of each wavelength at a subject sample point. Synthesized spectral transmittance of each wavelength is then calculated, and difference spectral transmittance of each wavelength that is difference between the estimated spectral transmittance of each wavelength and the synthesized spectral transmittance of each wavelength is calculated. A weight value of each wavelength is set based on the difference spectral transmittance of each wavelength, and the amount of dye at the subject sample point can be estimated using the set weight value, based on the estimated spectral transmittance of each wavelength at the subject sample point. Specifically, the estimation of an amount of dye can be performed while setting the weight value for a wavelength at which the value of the difference spectral transmittance is large and the estimation accuracy is predicted to be low to a small value. Therefore, the accuracy of estimation of an amount of dye can be improved.

Figure 14:
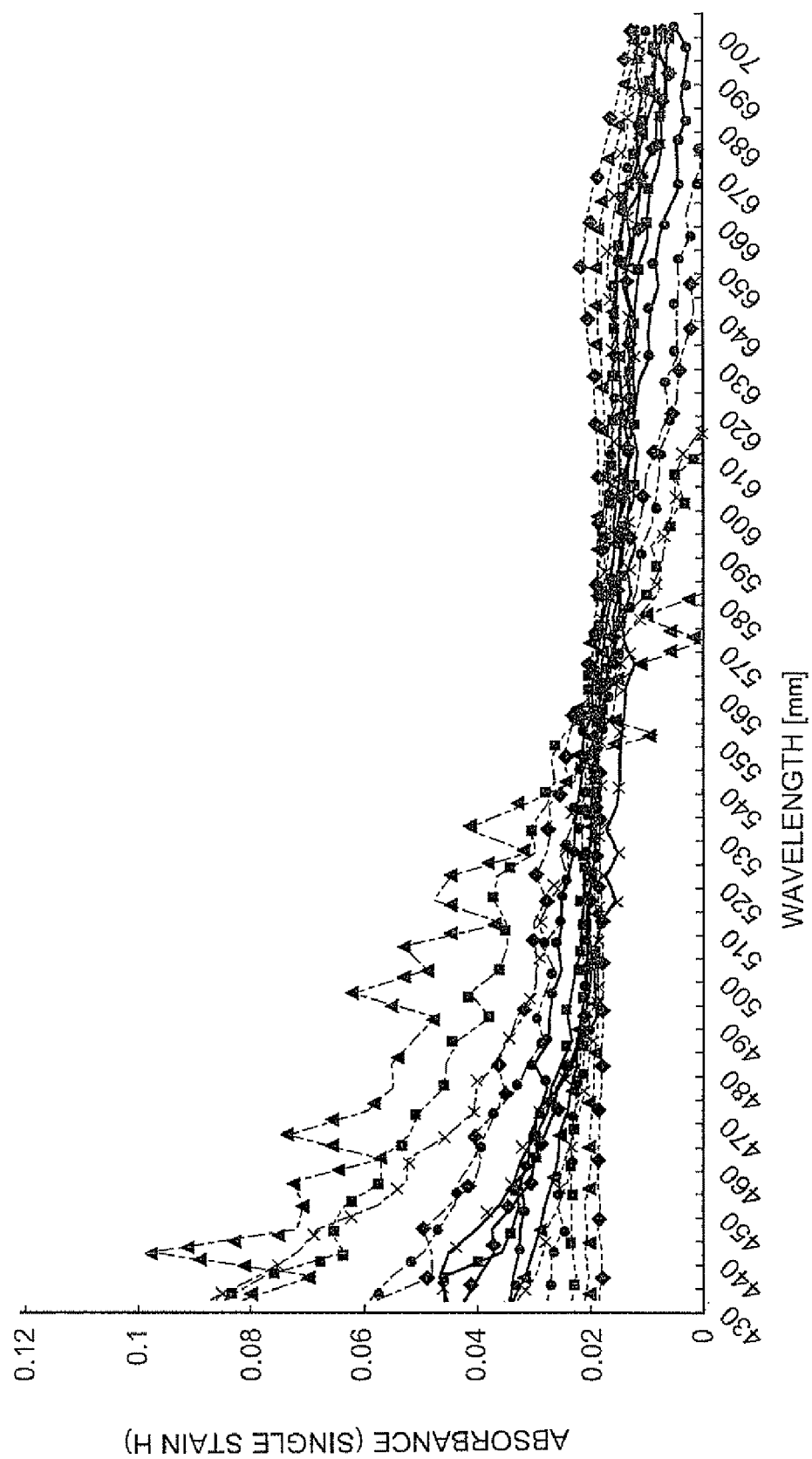
FIG. 14 is a chart showing single-stain spectral-characteristic values obtained from a single-stained sample that is stained by dye H in graph.
Figure 15:
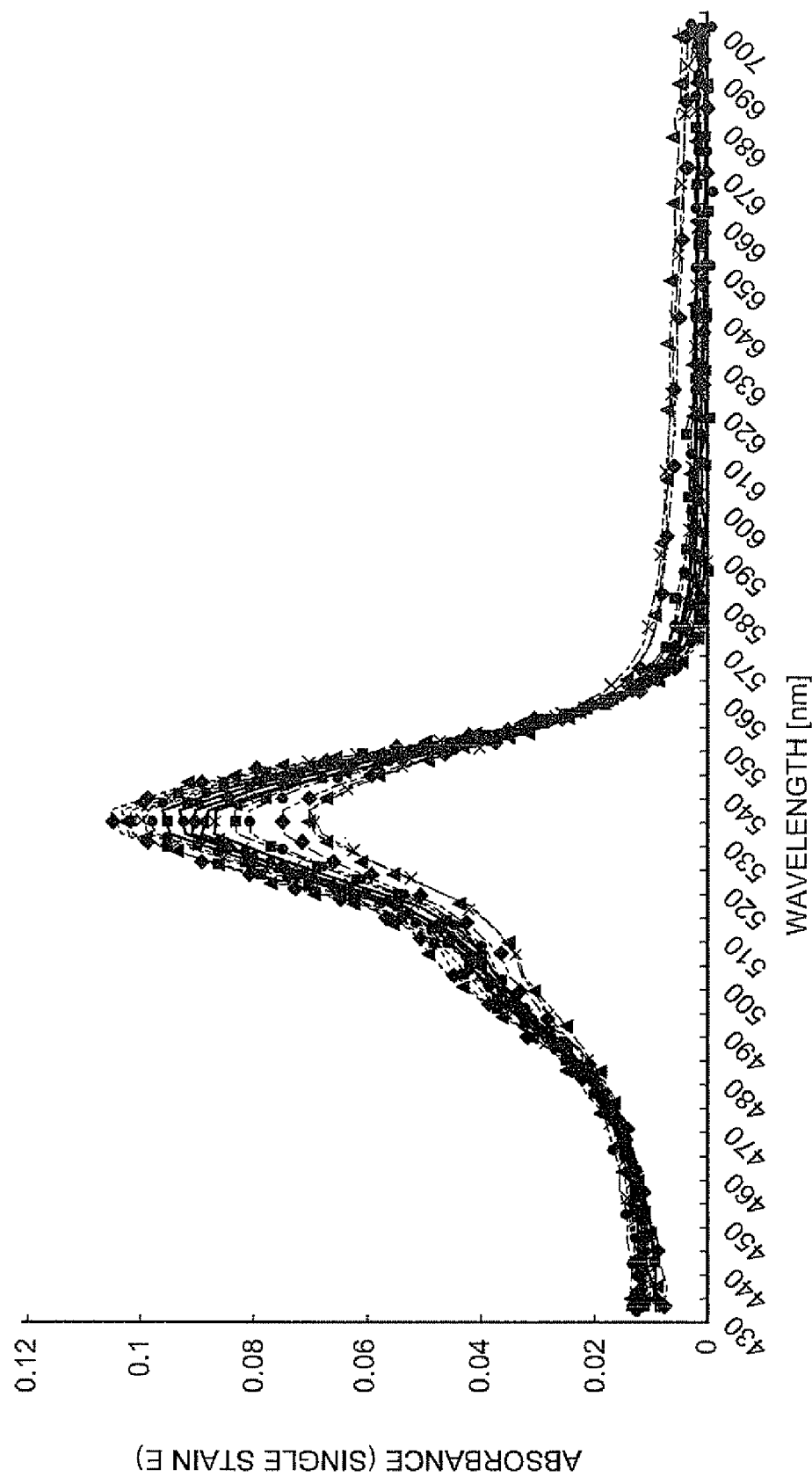
FIG. 15 is a chart showing single-stain spectral-characteristic values obtained from a single-stained sample that is stained by dye E in graph.
Figure 16:
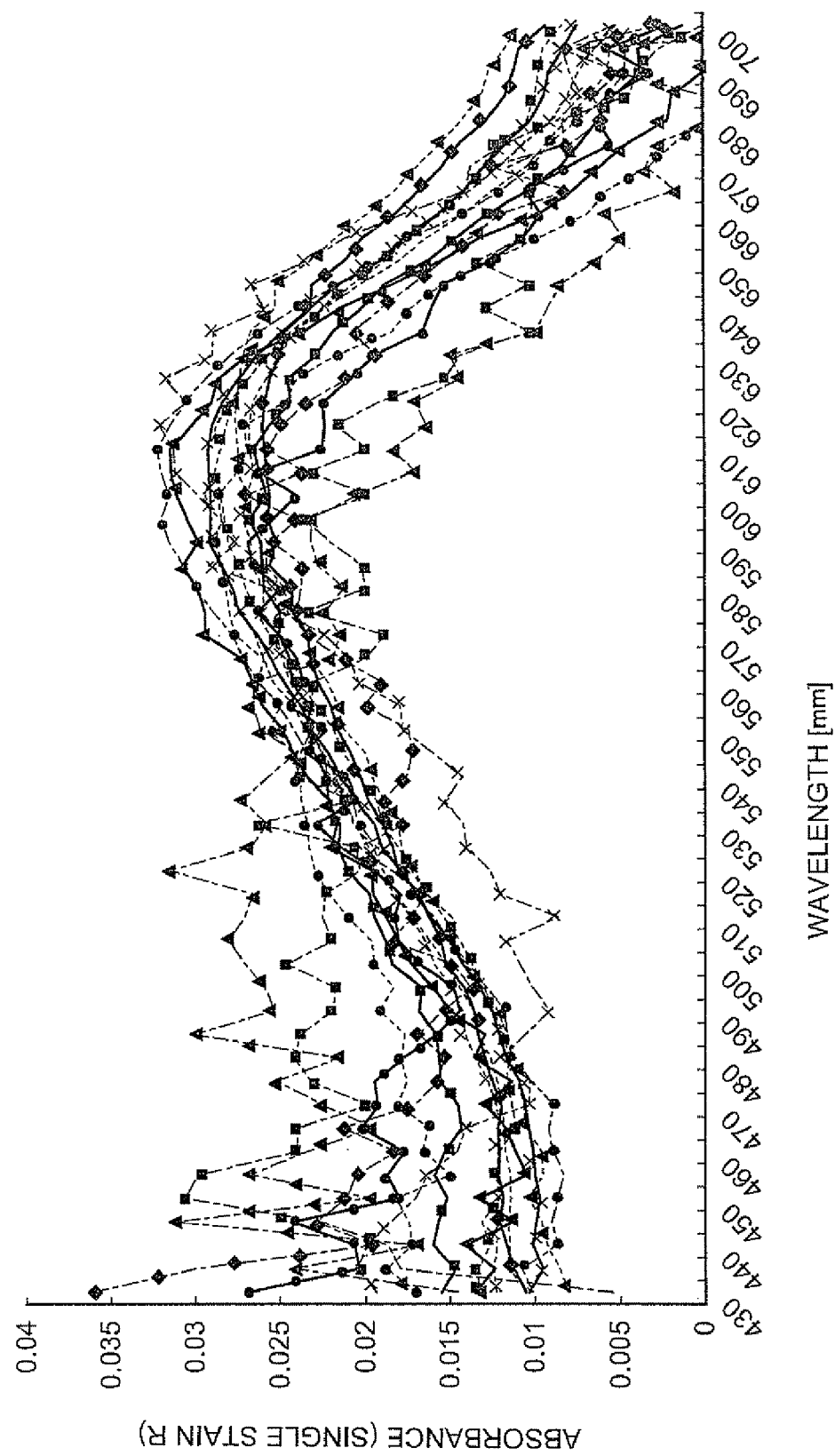
FIG. 16 is a chart showing single-stain spectral-characteristic values obtained from a single-stained sample that is stained by dye R in graph.

Next, a third embodiment is explained. First, the principle of calculation of a weight value performed in the third embodiment is explained. FIG. 14 is a chart showing single stain absorbance that is absorbance obtained by performing measurement at a plurality of positions on a single-stained sample that is stained by dye H in graph. Furthermore, FIG. 15 is a chart showing single stain absorbance that is absorbance obtained by performing measurement at a plurality of positions on a single-stained sample that is stained by dye E in graph. Moreover, FIG. 16 is a chart showing single stain absorbance that is absorbance obtained by performing measurement at a plurality of positions on a single-stained sample that is stained by dye R in graph. As explained by indicating in equation (14), in dye amount estimation, a single standard spectral characteristic value is determined for each dye in advance, and is used. However, as shown in FIG. 14 to FIG. 16, a value of absorbance measured at a plurality of positions on a single-stained sample varies among respective wavelengths. Particularly, variation is large in the single stain absorbance of dye H shown in FIG. 14 and the single stain absorbance of dye R shown in FIG. 16 compared to the single stain absorbance of dye E shown in FIG. 15. For example, in the case of dye H, variation occurs in a wide range throughout the wavelengths. In the case of dye R, variation is significant in a wavelength band from 430 nm to 560 nm. From the fact that values of single stain absorbance at respective wavelengths vary, it can be predicted that there is a case where a waveform of the standard spectral characteristic value of single stain absorbance and a waveform of the spectral characteristic value of each dye included in an estimation subject pixel do not coincide with each other depending on an applied standard spectral characteristic value. As a result, the estimation accuracy of dye amount can be predicted to be degraded. Therefore, in a third embodiment, the single stain absorbance of each of the dyes shown in FIG. 14 to FIG. 16 are measured in advance as a single-stain spectral-characteristic value and stored in a storage unit 150c. It can be configured such that values of spectral transmittance at a plurality of positions on a single-stained sample that is stained with the respective dyes are stored as a single-stain spectral-characteristic value. The dye that is dominant at the subject sample point is then identified, and a weight value of each wavelength used in dye amount estimation is set using a single-stain spectral-characteristic value of this dye.

Figure 17:
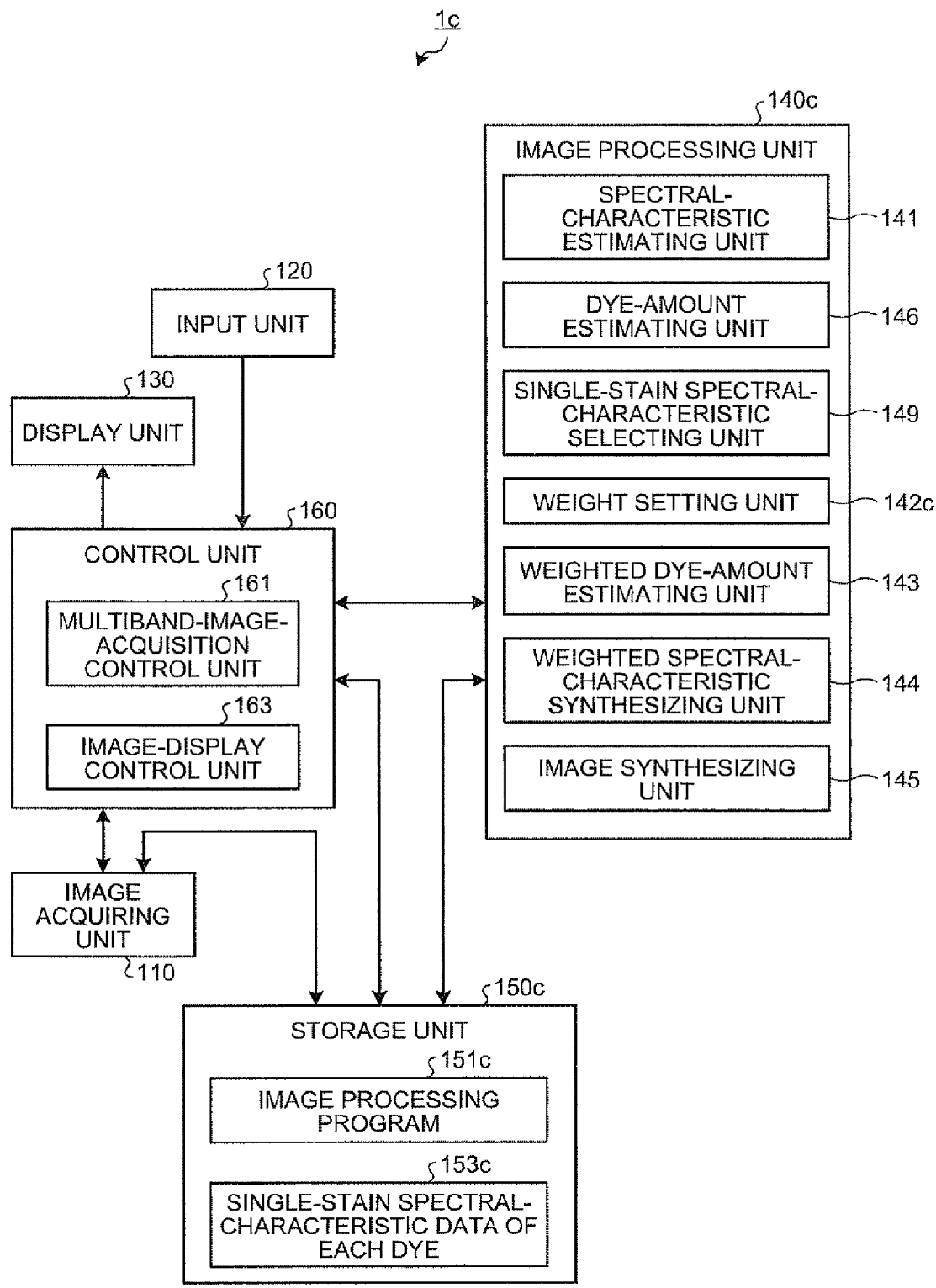
FIG. 17 is a block diagram of the image processing apparatus according to a third embodiment.

FIG. 17 is a block diagram of an image processing apparatus 1c according to the third embodiment. Like reference character refer to like parts to ones explained in the first embodiment or the second embodiment. In the third embodiment, the image processing apparatus 1c includes the image acquiring unit 110 explained illustrating in FIG. 1, the input unit 120, the display unit 130, an image processing unit 140c, the storage unit 150c, and the control unit 160 that controls the respective components.

The image processing unit 140c includes the spectral-characteristic estimating unit 141, the dye-amount estimating unit 146, a single-stain spectral-characteristic selecting unit 149, a weight setting unit 142c, the weighted dye-amount estimating unit 143, the weighted spectral-characteristic synthesizing unit 144, and the image synthesizing unit 145. The single-stain spectral-characteristic selecting unit 149 identifies a dye that is dominant at a subject sample point based on an estimated dye amount that is estimated by the dye-amount estimating unit 146, and selects a single-stain spectral characteristic value of each dye that is used to set a weighted value of each wavelength according to this identified dye. The weight setting unit 142c sets a weight value of each wavelength to be used in dye amount estimation using the single-stain spectral-characteristic value selected by the single-stain spectral-characteristic selecting unit 149.

Moreover, in the storage unit 150c, single-stain spectral-characteristic data 153c of each dye is stored, and the single-stain spectral-characteristic value of each of the dyes, dye H, dye E, and dye R, is set. This single-stain spectral-characteristic value of each dye is composed of a plurality of single-stain spectral-characteristic values of each wavelength measured at a plurality of positions on the single-stained sample that is stained with the respective dyes as shown in FIG. 14 to FIG. 16. Furthermore, in the storage unit 150c, an image processing program 151c to achieve processing of setting a weight value of each wavelength using one of the single-stain spectral-characteristic values of each dye, and processing of estimating an amount of dye of a subject sample is stored.

Figure 18:
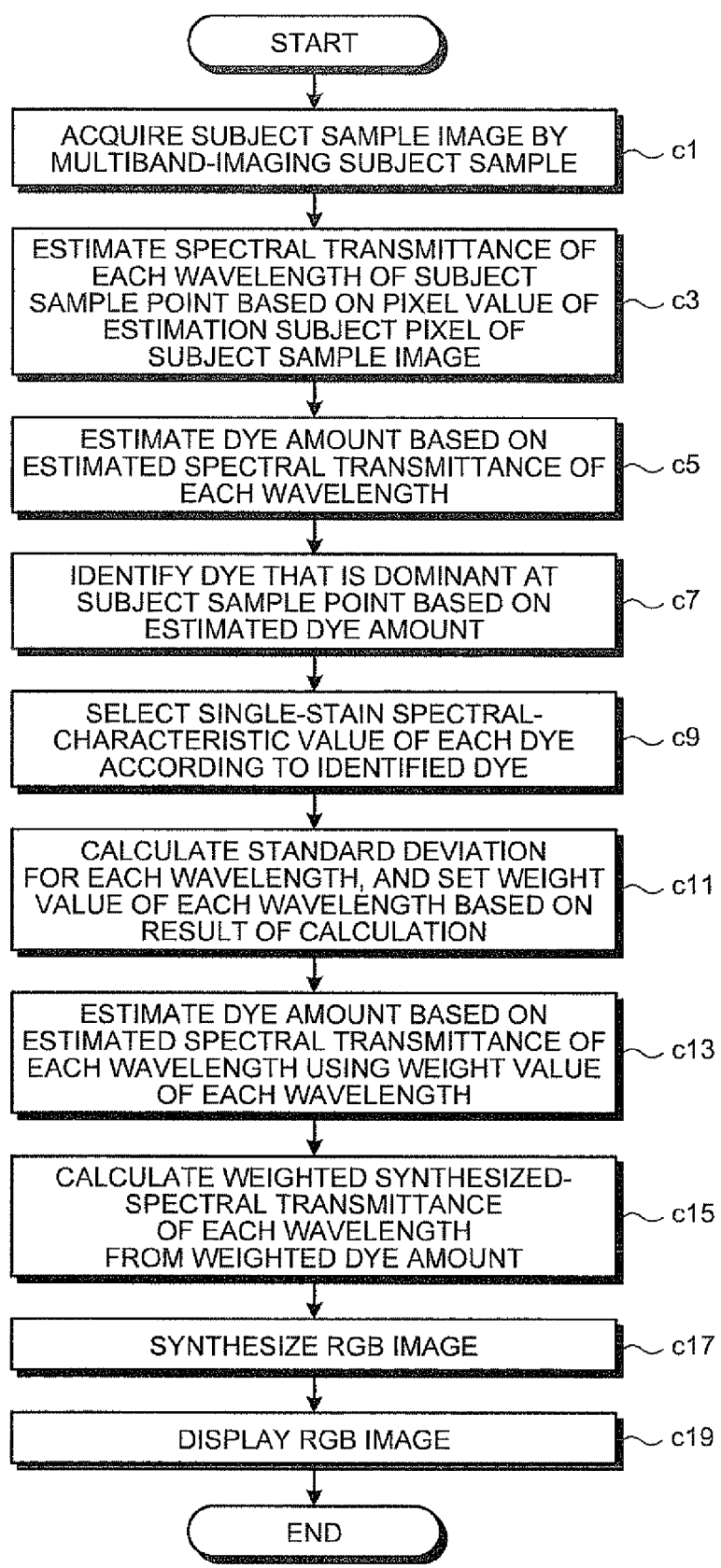
FIG. 18 is a flowchart showing processing performed by the image processing apparatus according to the third embodiment.
Figure 19:
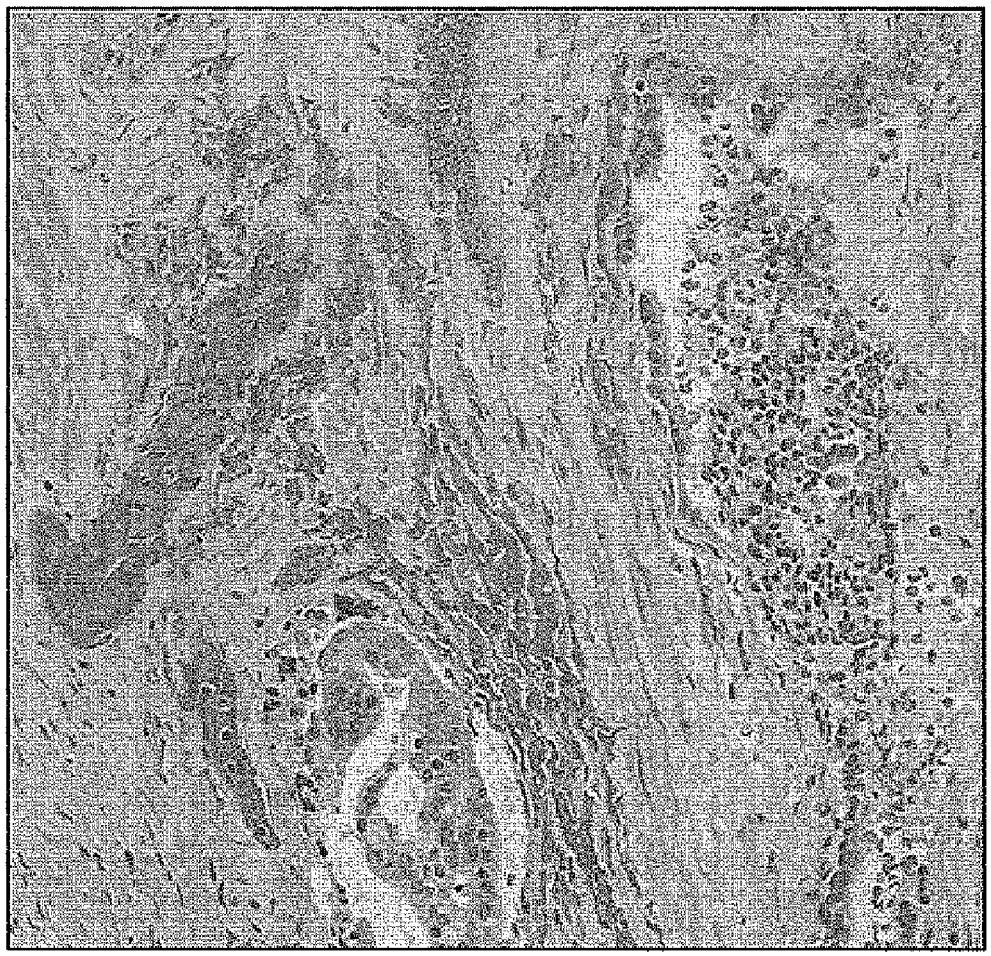
FIG. 19 is a view showing one example of an RGB image.

FIG. 18 is a flowchart showing processing performed by the image processing apparatus 1c according to the third embodiment. The processing explained herein is achieved by operation of the respective components of the image processing apparatus 1c in accordance with the image processing program 151c stored in the storage unit 150c.

As shown in FIG. 18, first, the multiband-image-acquisition control unit 161 controls operation of the image acquiring unit 110 to multiband-image a subject sample that is a subject of estimation of an amount of dye, to acquire a subject sample image (step c1). Subsequently, similarly to the first embodiment, the spectral-characteristic estimating unit 141 estimates spectral transmittance (estimated spectral transmittance) of each wavelength at a subject sample point based on a pixel value of an estimation subject pixel of the subject sample image acquired at step c1 (step c3). Similarly to the second embodiment, the dye-amount estimating unit 146 then estimates an amount of dye (estimated dye amount) of the subject sample based on the estimated spectral transmittance of each wavelength that is estimated at step a3 (step c5).

Subsequently, the single-stain spectral-characteristic selecting unit 149 identifies a dye that is dominant at the subject sample point based on the estimated dye amount that is estimated at step c5 (step c7). Specifically, first, a dye having the largest dye amount is identified from among the dyes that stain the point x being the estimation subject pixel of the subject sample image. For the comparison of a dye amount of the respective dyes, for example, $\tilde{d}_j$ that is calculated by the following equation (26) is used.

$$\tilde{d}_j = \sum_{\lambda=1}^{D} k_j(\lambda) \cdot d_j \qquad (26)$$

where $k_j(\lambda)$ expresses $k(\lambda)$ corresponding to dye j, and $d_j$ expresses virtual thickness of dye j. According to this equation (26), values of $\tilde{d}_j$ for the respective dyes, dye H, dye E, and dye R, are calculated successively, and a dye $j^{max}$ whose value of this $\tilde{d}_j$ is the largest is identified as a dye that is dominant at the subject sample point. By thus comparing the values of $\tilde{d}_j$ calculated for dye H, dye E, and dye R that stain the point x being the estimation subject pixel of the subject sample image, a dye that stains the most can be selected from among dye H, dye E, and dye R that stain the point x. The selected dye is identified as a dye that has the most dye amount and dominant at the point x. This dye $j^{max}$ is stored in the storage unit 150c. The single-stain spectral-characteristic selecting unit 149 then selects the single-stain spectral-characteristic value of a corresponding dye from the single-stain spectral-characteristic data 153c of each dye according to the identified dye (step c9).

Subsequently, the weight setting unit 142c calculates a standard deviation of a value at each wavelength from the single-stain spectral-characteristic value of each dye that is selected at step c9, and sets a weight value of each wavelength based on a result of calculation (step c11). For example, a weight value of a wavelength whose standard deviation of values of the respective wavelength is large is set to a small value, and a weight value of a wavelength whose standard deviation is small is set to a large value.

Specifically, a weight value of each wavelength is set as a value that is inversely proportional to the standard deviation calculated for each wavelength, according to the following equation (27). At this time, the weight value of each wavelength can be set, standardizing the weight value at a wavelength in which the standard deviation is the largest as a maximum value "1".

$$\omega_\lambda = \frac{1}{k_j^{dev}(\lambda)} \quad (27)$$

where $\omega_\lambda$ indicates the weight value at wavelength $\lambda$, and $k_j^{dev}(\lambda)$ indicates the standard deviation at wavelength $\lambda$. This is repeated for D times, which is the number of wavelengths, and $\omega_1, \omega_2, \ldots, \omega_D$ are calculated. The calculated respective values of $\omega_1, \omega_2, \ldots, \omega_D$ are stored in the storage unit 150c.

A method of setting the weight value $\omega_\lambda$ is not limited to the above method. For example, it can be configured such that standard deviation calculated for each wavelength is compared with a predetermined threshold that is set in advance, and a weight value of each wavelength is set in two stages according to the value relative to the threshold. Alternatively, it can be configured such that a plurality of thresholds are set in multiple stages, and a weight value of each wavelength is set in stages according to the value of a standard deviation.

Subsequently, the weighted dye-amount estimating unit 143 converts the estimated spectral transmittance T(x) of each wavelength that is estimated at step c3 into absorbance again, and estimates an amount of dye (weighted dye amount) of the subject sample by using the weight value $\omega_\lambda$ of each wavelength set at step c11 (step c13). The processing herein can be performed in a similar manner as the first embodiment. Subsequently, the weighted spectral-characteristic synthesizing unit 144 synthesizes spectral transmittance based on the weighted dye amount estimated at step c13, and calculates weighted synthesized-spectral transmittance of each wavelength (step c15). The image synthesizing unit 145 then synthesizes an RGB image to be displayed using the weighted synthesized-spectral transmittance of each wavelength (step c17), and the image-display control unit 163 performs the control to display the RGB image composed at step c17 on the display unit 130 (step c19).

As described, according to the third embodiment, first, estimation of an amount of dye is performed based on estimated spectral transmittance of each wavelength at a subject sample point. A dye that is dominant at the subject sample point is then identified, and a weight value of each wavelength is set using a single-stain spectral characteristic value of each dye corresponding to this dye. An amount of dye at the subject sample point can be estimated using the set weight value, based on the estimated spectral transmittance of each wavelength at the subject sample point. Specifically, the standard deviation of values at respective wavelengths is calculated based on the selected single-stain spectral-characteristic value of each dye, and from a result of the calculation, the estimation of an amount of dye can be performed while setting the weight value for a wavelength at which variation in values at the respective wavelengths is large and the estimation accuracy is predicted to be low to a small value. Therefore, the accuracy of estimation of an amount of dye can be improved.

Although in the third embodiment, a case where a dye that is dominant at a subject sample point is identified based on an amount of dye estimated from estimated spectral transmittance of each wavelength has been explained, it can be arranged such that a dye that is dominant at a subject sample point is identified based on a pixel value of an estimation subject pixel of a stained sample image. Alternatively, a dye that is dominant at a subject sample point can be identified based on estimated spectral transmittance of each wavelength. A value of spectral transmittance is determined uniquely corresponding to a pixel value. In addition, from the value of spectral transmittance, an amount of dye, and a dye having the most amount are uniquely determined. Therefore, it is possible to set correspondence among a pixel value, spectral transmittance, and an amount of dye and a dye having the most amount in advance. For example, it can be arranged such that spectral transmittance corresponding to various combinations of pixel values is acquired and recorded in a table together with an amount of dye determined from this spectral transmittance and a dye having the most amount, to be recorded in the storage unit 150c. By reading a value of spectral transmittance corresponding to a pixel value of an estimation subject pixel therefrom, and a weight value of each wavelength can be set based on this value. It can be configured such that a dye having the most amount corresponding to the pixel value of the estimation subject pixel is read, and a dye that is dominant at the subject sample point is identified. Alternatively, it can be configured such that based on the estimated spectral transmittance, a dye having the most amount corresponding thereto is read, and a dye that is dominant at the subject sample point is identified.

Moreover, although in the third embodiment, a case where a single-stain spectral-characteristic value of each dye is measured in advance and stored as single-stain spectral-characteristic data 153c in the storage unit 150c has been explained, it is not limited thereto. For example, an image processing apparatus is configured providing a spectral-characteristic measuring unit using a spectrometer. Further, it can be configured such that a spectral characteristic value of a single-stained sample that is stained respectively by each of dye H, dye E, and dye R is measured by the spectral-characteristic measuring unit as necessary, to create/update the single-stain spectral-characteristic data 153c of each dye in the storage unit 150c.

Furthermore, although in the first to the third embodiments described above, a case where spectral transmittance as a spectral characteristic value is estimated from a multiband image that is obtained by imaging a pathological sample has been explained, the present invention can also be applied similarly to a case where spectral reflectivity or absorbance is estimated as the spectral characteristic value.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. An image processing apparatus comprising:
  a spectral-characteristic estimating unit that estimates, based on a pixel value of a pixel of a stained sample image, a spectral characteristic value of each wavelength at a corresponding point on a stained sample corresponding to the pixel, the stained sample image being obtained by imaging the stained sample that is stained with a plurality of dyes;

a weight setting unit that sets a weight value of each wavelength based on the spectral characteristic value of each wavelength estimated by the spectral-characteristic estimating unit; and a weighted dye-amount estimating unit that estimates an amount of dye at the corresponding point on the stained sample as a weighted dye amount based on the spectral characteristic value of each wavelength estimated by the spectral-characteristic estimating unit using the weight value of each wavelength.

2. The image processing apparatus according to claim 1, wherein the weight setting unit sets the spectral characteristic value of each wavelength estimated by the spectral-characteristic estimating unit as the weight value of each wavelength.

3. The image processing apparatus according to claim 1, wherein the weight setting unit compares the spectral characteristic value of each wavelength estimated by the spectral-characteristic estimating unit with a predetermined threshold, and sets the weight value of each wavelength according to the value relative to the threshold.

4. The image processing apparatus according to claim 1, wherein the weight setting unit calculates a predetermined converted value from the spectral characteristic value of each wavelength estimated by the spectral-characteristic estimating unit, and sets the converted value as the weight value of each wavelength.

5. The image processing apparatus according to claim 4, wherein
the spectral characteristic value of each wavelength is spectral transmittance, and
the weight setting value calculates an inverse of absorbance of each wavelength that is obtained by performing logarithmic conversion on the spectral characteristic value of each wavelength as the converted value.

6. The image processing apparatus according to claim 4, wherein
the spectral characteristic value of each wavelength is spectral transmittance, and
the weight setting value calculates a product of a square root of the spectral characteristic value of each wavelength and an inverse of absorbance of each wavelength that is obtained by performing logarithmic conversion on the spectral characteristic value of each wavelength, as the converted value.

7. The image processing apparatus according to claim 1, further comprising:
a dye-amount estimating unit that estimates an amount of dye of the stained sample based on the spectral characteristic value of each wavelength estimated by the spectral-characteristic estimating unit;
a spectral-characteristic synthesizing unit that calculates a synthesized spectral-characteristic value of each wavelength by synthesizing a spectral characteristic value based on the amount of dye estimated by the dye-amount estimating unit; and
a difference spectral-characteristic calculating unit that calculates a difference spectral-characteristic value of each wavelength by subtracting the synthesized spectral-characteristic value of each wavelength from the spectral characteristic value of each wavelength estimated by the spectral-characteristic estimating unit, wherein
the weight setting unit sets the weight value of each wavelength based on the difference spectral-characteristic value of each wavelength calculated by the difference spectral-characteristic calculating unit.

8. The image processing unit according to claim 7, wherein the weight setting unit sets the weight value such that a weight value set for a wavelength at which the difference spectral-characteristic value is large is smaller than a weight value set for a wavelength at which the difference spectra-property value is small.

9. The image processing apparatus according to claim 1, further comprising:
a weighted spectral-characteristic synthesizing unit that calculates synthesized spectral characteristic value of each wavelength as a weighted synthesized-spectral characteristic value of each wavelength, by synthesizing a spectral characteristic value based on the weighted dye amount estimated by the weighted dye-amount estimating unit; and
an image synthesizing unit that synthesizes an RGB image based on the weighted synthesized-spectral characteristic value of each wavelength.

10. The image processing apparatus according to claim 9, wherein
the spectral-characteristic estimating unit estimates the spectral characteristic value of each wavelength for all pixels constituting the stained sample image,
the weighted dye-amount estimating unit that estimates the amount of dye at the corresponding point on the stained sample corresponding to respective pixels on the stained sample image as the weighted dye amount, based on the spectral characteristic value of each wavelength estimated for all pixels constituting the stained sample image,
the weighted spectral-characteristic synthesizing unit calculates the weighted synthesized-spectral characteristic value of each wavelength at each pixel of the stained sample image, based on the weighted dye amount at the corresponding point on the stained sample corresponding to each pixel of the stained sample image, and
the image synthesizing unit synthesizes the RGB image by converting the weighted synthesized-spectral characteristic value of each wavelength at each pixel of the stained sample image into an RGB value.

11. The image processing apparatus according to claim 9, further comprising an image-display control unit that displays the RGB image synthesized by the image synthesizing unit on a display unit.

12. The image processing apparatus according to claim 1, wherein the dyes include either of hematoxylin, eosin, eosin that stains red corpuscles, and a coloring matter of red corpuscles that are not stained.

13. The image processing apparatus according to claim 1, wherein estimation of the weighted dye amount by the weighted dye-amount estimating unit is performed using Lambert-Beer law.

14. The image processing apparatus according to claim 1, wherein the spectral characteristic value includes spectral transmittance, spectral reflectivity, and absorbance.

15. An image processing unit comprising:
a spectral-characteristic estimating unit that estimates, based on a pixel value of a pixel of a stained sample image, a spectral characteristic value of each wavelength at a corresponding point on the stained sample corresponding to the pixel, the stained sample image being obtained by imaging a stained sample that is stained with a plurality of dyes;
a weight setting unit that sets a weight value of each wavelength based on the spectral characteristic value of each wavelength corresponding to the pixel value of the pixel according to correlation between the pixel value and the spectral characteristic value of each wavelength, the correlation set in advance; and
a weighted dye-amount estimating unit that estimates an amount of dye at the corresponding point on the stained sample as a weighted dye amount based on the spectral characteristic value of each wavelength estimated by the spectral-characteristic estimating unit using the weight value of each wavelength.

16. The image processing apparatus according to claim 15, further comprising:
a weighted spectral-characteristic synthesizing unit that calculates synthesized spectral characteristic value of each wavelength as a weighted synthesized-spectral characteristic value of each wavelength, by synthesizing a spectral characteristic value based on the weighted dye amount estimated by the weighted dye-amount estimating unit; and
an image synthesizing unit that synthesizes an RGB image based on the weighted synthesized-spectral characteristic value of each wavelength.

17. The image processing apparatus according to claim 16, wherein
the spectral-characteristic estimating unit estimates the spectral characteristic value of each wavelength for all pixels constituting the stained sample image,
the weighted dye-amount estimating unit that estimates the amount of dye at the corresponding point on the stained sample corresponding to respective pixels on the stained sample image as the weighted dye amount, based on the spectral characteristic value of each wavelength estimated for all pixels constituting the stained sample image,
the weighted spectral-characteristic synthesizing unit calculates the weighted synthesized-spectral characteristic value of each wavelength at each pixel of the stained sample image, based on the weighted dye amount at the corresponding point on the stained sample corresponding to each pixel of the stained sample image, and
the image synthesizing unit synthesizes the RGB image by converting the weighted synthesized-spectral characteristic value of each wavelength at each pixel of the stained sample image into an RGB value.

18. The image processing apparatus according to claim 16, further comprising an image-display control unit that displays the RGB image synthesized by the image synthesizing unit on a display unit.

19. The image processing apparatus according to claim 15, wherein the dyes include either of hematoxylin, eosin, eosin that stains red corpuscles, and a coloring matter of red corpuscles that are not stained.

20. The image processing apparatus according to claim 15, wherein estimation of the weighted dye amount by the weighted dye-amount estimating unit is performed using Lambert-Beer law.

21. The image processing apparatus according to claim 15, wherein the spectral characteristic value includes spectral transmittance, spectral reflectivity, and absorbance.

22. An image processing unit comprising:
a spectral-characteristic estimating unit that estimates, based on a pixel value of a pixel of a stained sample image, a spectral characteristic value of each wavelength at a corresponding point on the stained sample corresponding to the pixel, the stained sample image being obtained by imaging a stained sample that is stained with a plurality of dyes;
a weight setting unit that sets a weight value of each wavelength using either one of single-stain spectral-characteristic values of each color that are measured for the single-stained samples stained respectively by the dyes; and
a weighted dye-amount estimating unit that estimates an amount of dye at the corresponding point on the stained sample as a weighted dye amount based on the spectral characteristic value of each wavelength estimated by the spectral-characteristic estimating unit using the weight value of each wavelength.

23. The image processing apparatus according to claim 22, further comprising:
a dye-amount estimating unit that estimates an amount of dye of the stained sample based on the spectral characteristic value of each wavelength estimated by the spectral-characteristic estimating unit; and
a single-stain spectral-characteristic selecting unit that identifies a dye that is dominant at the corresponding point on the stained sample based on the amount of dye estimated by the dye-amount estimating unit, and selects either one of the single-stain spectral-characteristic values of each color according to the identified dye.

24. The image processing apparatus according to claim 22, further comprising a single-stain spectral-characteristic selecting unit that identifies a dye that is dominant at the corresponding point on the stained sample based on the spectral characteristic value of each wavelength estimated by the spectral-characteristic estimating unit, and selects either one of the single-stain spectral-characteristic values of each color according to the identified dye.

25. The image processing apparatus according to claim 22, further comprising a single-stain spectral-characteristic selecting unit that identifies a dye that is dominant at the corresponding point on the stained sample based on the pixel value of the stained sample image, and selects either one of the single-stain spectral-characteristic values of each color according to the identified dye.

26. The image processing apparatus according to claim 22, wherein
the single-stain spectral-characteristic values of each color are constituted of a plurality of single-stain spectral-characteristic values of respective wavelength that are measured at a plurality of corresponding points on the single-stained sample stained with a corresponding dye, and
the weight setting unit calculates standard deviation of each wavelength from the single-stain spectral-characteristic value selected by the single-stain spectral-characteristic selecting unit, and sets the weight value of each wavelength based on a result of calculation.

27. The image processing apparatus according to claim 22, further comprising a single-stain spectral-characteristic measuring unit that measures the single-stain spectral-characteristic values of respective wavelength of the respective single-stained samples by a spectrometer.

28. The image processing apparatus according to claim 22, further comprising:
a weighted spectral-characteristic synthesizing unit that calculates synthesized spectral characteristic value of each wavelength as a weighted synthesized-spectral characteristic value of each wavelength, by synthesizing a spectral characteristic value based on the weighted dye amount estimated by the weighted dye-amount estimating unit; and an image synthesizing unit that synthesizes an RGB image based on the weighted synthesized-spectral characteristic value of each wavelength.

29. The image processing apparatus according to claim 28, wherein the spectral-characteristic estimating unit estimates the spectral characteristic value of each wavelength for all pixels constituting the stained sample image, the weighted dye-amount estimating unit that estimates the amount of dye at the corresponding point on the stained sample corresponding to respective pixels on the stained sample image as the weighted dye amount, based on the spectral characteristic value of each wavelength estimated for all pixels constituting the stained sample image, the weighted spectral-characteristic synthesizing unit calculates the weighted synthesized-spectral characteristic value of each wavelength at each pixel of the stained sample image, based on the weighted dye amount at the corresponding point on the stained sample corresponding to each pixel of the stained sample image, and the image synthesizing unit synthesizes the RGB image by converting the weighted synthesized-spectral characteristic value of each wavelength at each pixel of the stained sample image into an RGB value.

30. The image processing apparatus according to claim 28, further comprising an image-display control unit that displays the ROB image synthesized by the image synthesizing unit on a display unit.

31. The image processing apparatus according to claim 22, wherein the dyes include either of hematoxylin, eosin, eosin that stains red corpuscles, and a coloring matter of red corpuscles that are not stained.

32. The image processing apparatus according to claim 22, wherein estimation of the weighted dye amount by the weighted dye-amount estimating unit is performed using Lambert-Beer law.

33. The image processing apparatus according to claim 22, wherein the spectral characteristic value includes spectral transmittance, spectral reflectivity, and absorbance.

34. A computer program product having a computer readable medium including programmed instructions for estimating an amount of dye of a stained sample from a stained sample image obtained by imaging the stained sample stained with a plurality of dyes, wherein the instructions, when executed by a computer, cause the computer to perform:

estimating, based on a pixel value of a pixel constituting the stained sample image, a spectral characteristic value of each wavelength at a corresponding point on the stained sample corresponding to the pixel;

setting a weight value of each wavelength based on the estimated spectral characteristic value of each wavelength; and estimating an amount of dye at the corresponding point on the stained sample as a weighted dye amount based on the estimated spectral characteristic value of each wavelength using the weight value of each wavelength.

35. A computer program product having a computer readable medium including programmed instructions for estimating an amount of dye of a stained sample from a stained sample image obtained by imaging the stained sample stained with a plurality of dyes, wherein the instructions, when executed by a computer, cause the computer to perform:

estimating, based on a pixel value of a pixel constituting the stained sample image, a spectral characteristic value of each wavelength at a corresponding point on the stained sample corresponding to the pixel;

setting a weight value of each wavelength based on the spectral characteristic value of each wavelength corresponding to the pixel value of the pixel according to correlation between the pixel value and the spectral characteristic value of each wavelength, the correlation set in advance; and estimating an amount of dye at the corresponding point on the stained sample as a weighted dye amount based on the estimated spectral characteristic value of each wavelength using the weight value of each wavelength.

36. A computer program product having a computer readable medium including programmed instructions for estimating an amount of dye of a stained sample from a stained sample image obtained by imaging the stained sample stained with a plurality of dyes, when executed by a computer, cause the computer to perform:

estimating, based on a pixel value of a pixel constituting the stained sample image, a spectral characteristic value of each wavelength at a corresponding point on the stained sample corresponding to the pixel;

setting a weight value of each wavelength using either one of single-stain spectral-characteristic values of each color that are measured for the single-stained samples stained respectively by the dyes; and estimating an amount of dye at the corresponding point on the stained sample as a weighted dye amount based on the estimated spectral characteristic value of each wavelength using the weight value of each wavelength.

* * * * *